US012513002B2

(12) United States Patent
Millar et al.

(10) Patent No.: US 12,513,002 B2
(45) Date of Patent: Dec. 30, 2025

(54) HASHING TECHNIQUES FOR VERIFYING CORRECTNESS OF ASSOCIATIONS BETWEEN ASSETS RELATED TO EVENTS AND ADDRESSABLE COMPUTER NETWORK ASSETS

(71) Applicant: Rapid7, Inc., Boston, MA (US)

(72) Inventors: Stuart Millar, Bangor (GB); Ralph McTeggart, Belfast (GB)

(73) Assignee: Rapid7, Inc., Boston, MA (US)

( * ) Notice: Subject to any disclaimer, the term of this patent is extended or adjusted under 35 U.S.C. 154(b) by 318 days.

(21) Appl. No.: 18/190,371

(22) Filed: Mar. 27, 2023

(65) Prior Publication Data

US 2024/0039911 A1 Feb. 1, 2024

Related U.S. Application Data

(60) Provisional application No. 63/392,816, filed on Jul. 27, 2022.

(51) Int. Cl.
 *H04L 9/32* (2006.01)
 *G06N 3/0455* (2023.01)
 (Continued)

(52) U.S. Cl.
 CPC ......... *H04L 9/3247* (2013.01); *G06N 3/0455* (2023.01); *G06N 3/08* (2013.01);
 (Continued)

(58) Field of Classification Search
 CPC ..... H04L 9/3247; H04L 9/3236; H04L 41/06; H04L 41/12; H04L 41/16; H04L 41/145;
 (Continued)

(56) References Cited

U.S. PATENT DOCUMENTS 7,808,897 B1 10/2010 Mehta et al.
9,386,037 B1 7/2016 Hunt et al.
(Continued)

OTHER PUBLICATIONS

Bojanowski et al., Enriching Word Vectors with Subword Information. arXiv preprint arXiv:1607.04606. Jun. 19, 2017. 12 pages.
(Continued)

*Primary Examiner* — Khoi V Le
(74) *Attorney, Agent, or Firm* — Wolf, Greenfield & Sacks, P.C.

(57) ABSTRACT

Techniques for verifying correctness of associations between assets related to events detected in at least one computer network and assets in an asset catalog for the at least one computer network. The techniques include obtaining information specifying a first asset and a first set of assets with which the first asset was previously associated; generating a signature of the first asset from the computer network addressing information for the first asset; generating a hashed signature by applying a locality sensitive hashing (LSH) technique to the signature; associating the first asset with a second set of assets in the asset catalog using the hashed signature and at least one hashed signature of the at least one asset in the asset catalog; and when it is determined that the second set of includes the first set, outputting an indication that the first asset was correctly associated with the first set of assets.

20 Claims, 24 Drawing Sheets

(51) Int. Cl.
  *G06N 3/08* (2023.01)
  *H04L 9/40* (2022.01)
  *H04L 41/06* (2022.01)
  *H04L 41/12* (2022.01)
  *H04L 41/16* (2022.01)

(52) U.S. Cl.
  CPC ............ *H04L 9/3236* (2013.01); *H04L 41/06* (2013.01); *H04L 41/12* (2013.01); *H04L 41/16* (2013.01); *H04L 63/0876* (2013.01); *H04L 63/10* (2013.01); *H04L 63/20* (2013.01)

(58) Field of Classification Search
  CPC ..... H04L 63/0876; H04L 63/10; H04L 63/20; G06N 3/0455; G06N 3/08
  See application file for complete search history.

(56) References Cited

U.S. PATENT DOCUMENTS

| | | |
|---|---|---|
| 10,142,306 B1 | 11/2018 | Shemesh et al. |
| 10,848,514 B2 | 11/2020 | Christian |
| 11,290,343 B1 | 3/2022 | Isoda |
| 12,003,362 B2 | 6/2024 | Millar et al. |
| 12,143,505 B2 | 11/2024 | Millar et al. |
| 2006/0195208 A1 | 8/2006 | Sammer et al. |
| 2007/0030824 A1 | 2/2007 | Ribaudo et al. |
| 2008/0104276 A1* | 5/2008 | Lahoti ................ G06F 21/6218 709/245 |
| 2010/0198967 A1 | 8/2010 | Takahashi |
| 2012/0159584 A1 | 6/2012 | Pizot et al. |
| 2013/0014261 A1 | 1/2013 | Milliken et al. |
| 2014/0164825 A1 | 6/2014 | Grcanac et al. |
| 2014/0195532 A1 | 7/2014 | Dheap et al. |
| 2018/0089471 A1 | 3/2018 | Chiarella et al. |
| 2018/0248903 A1 | 8/2018 | Villella et al. |
| 2019/0043054 A1 | 2/2019 | Crank et al. |
| 2019/0268309 A1 | 8/2019 | Govindarajan et al. |
| 2020/0162247 A1 | 5/2020 | Nix |
| 2020/0272428 A1 | 8/2020 | Katakam et al. |
| 2020/0285770 A1 | 9/2020 | Brannon et al. |
| 2020/0364369 A1 | 11/2020 | Brannon et al. |
| 2021/0049525 A1 | 2/2021 | Unger et al. |
| 2021/0173952 A1* | 6/2021 | Raphael .............. G06F 21/6218 |
| 2021/0203673 A1 | 7/2021 | dos Santos et al. |
| 2021/0294713 A1 | 9/2021 | Hicks et al. |
| 2021/0351937 A1* | 11/2021 | Thacker .................. G06F 16/27 |
| 2022/0086088 A1 | 3/2022 | Tobiyama et al. |
| 2022/0141276 A1 | 5/2022 | Sun et al. |
| 2022/0327007 A1 | 10/2022 | Adogla et al. |
| 2022/0351066 A1 | 11/2022 | Bikumala et al. |
| 2022/0376924 A1 | 11/2022 | Tang et al. |
| 2022/0417286 A1 | 12/2022 | Moon |
| 2023/0071264 A1 | 3/2023 | Hakala et al. |
| 2023/0412602 A1 | 12/2023 | Gyarmathy et al. |
| 2024/0039730 A1 | 2/2024 | Millar et al. |
| 2024/0039733 A1 | 2/2024 | Millar et al. |
| 2024/0039779 A1 | 2/2024 | Millar et al. |
| 2024/0112161 A1* | 4/2024 | Rand ........................ H04L 9/50 |
| 2024/0297795 A1 | 9/2024 | Millar et al. |

OTHER PUBLICATIONS

Joulin et al., Bag of Tricks for Efficient Text Classification. Proceedings of the 15th Conference of the European Chapter of the Association for Computational Linguistics: vol. 2, Short Papers. Apr. 2017;427-31.

Joulin et al., Fasttext. zip: Compressing text classification models. arXiv preprint arXiv:1612.03651. Dec. 12, 2016. 13 pages.

Mikolov et al., Distributed representations of words and phrases and their compositionality. arXiv 2013. arXiv preprint arXiv:1310.4546. Oct. 16, 2013. 9 pages.

Mikolov et al., Efficient estimation of word representations in vector space. arXiv preprint arXiv:1301.3781. Sep. 7, 2013. 12 pages.

Pennington et al., Glove: Global vectors for word representation. Proceedings of the 2014 conference on empirical methods in natural language processing (EMNLP) Oct. 2014; 1532-43.

* cited by examiner

HASHING TECHNIQUES FOR VERIFYING CORRECTNESS OF ASSOCIATIONS BETWEEN ASSETS RELATED TO EVENTS AND ADDRESSABLE COMPUTER NETWORK ASSETS

CROSS-REFERENCE TO RELATED APPLICATIONS

This application claims the benefit of priority under 35 U.S.C. 119 of U.S. Provisional Patent Application Ser. No. 63/392,816, filed on Jul. 27, 2022, titled "SYSTEMS AND METHODS FOR ASSOCIATING ASSETS RELATED TO EVENTS WITH ADDRESSABLE COMPUTER NETWORK ASSETS", which is incorporated by reference in its entirety herein.

BACKGROUND

A computer network interconnects various devices (e.g., desktop computers, servers, laptops, tablet devices, printers, cameras, televisions, smartphones, PDAs, and any other types of network-enabled electronic devices) and allows them to share information according to one or more communication protocols. Today, virtually every business and service provider relies on computer networks. A typical computer network can interconnect anywhere from several devices, such as a household computer network connecting household appliances like handheld phones and routers, to hundreds of millions of devices, such as an Internet service provider's computer network covering a customer base of thousands or millions of people.

Computer network traffic may be monitored for various purposes including, for example, detecting malicious user behavior, identifying network vulnerabilities, cybersecurity, determining compliance with computer network policies, load balancing, and monitoring and analyzing user behavior patterns. Modern computer networks carry a large volume of network traffic. Monitoring computer networks in real-time is challenging.

SUMMARY

Some embodiments provide for a method for associating assets related to events detected in at least one computer network with respective assets in an asset catalog for the at least one computer network, the asset catalog assets being addressable on the at least one computer network, the method comprising: while monitoring activity on the at least one computer network, obtaining information about an event related to a first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with at least one asset in the asset catalog using the hashed signature of the first asset and at least one hashed signature of the at least one asset in the asset catalog; and outputting information identifying the at least one asset with which the first asset was associated.

Some embodiments provide for a system for associating assets related to events detected in at least one computer network with respective assets in an asset catalog for the at least one computer network, the asset catalog assets being addressable on the at least one computer network, the system comprising: at least one computer hardware processor; and at least one non-transitory computer-readable storage medium storing processor executable instructions that, when executed by the at least one computer hardware processor, cause the at least one computer hardware processor to perform a method comprising: while monitoring activity on the at least one computer network, obtaining information about an event related to a first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with at least one asset in the asset catalog using the hashed signature of the first asset and at least one hashed signature of the at least one asset in the asset catalog; and outputting information identifying the at least one asset with which the first asset was associated.

Some embodiments provide for at least one non-transitory computer-readable storage medium storing processor executable instructions that, when executed by at least one computer hardware processor, cause the at least one computer hardware processor to perform a method for associating assets related to events detected in at least one computer network with respective assets in an asset catalog for the at least one computer network, the asset catalog assets being addressable on the at least one computer network, the method comprising: while monitoring activity on the at least one computer network, obtaining information about an event related to a first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with at least one asset in the asset catalog using the hashed signature of the first asset and at least one hashed signature of the at least one asset in the asset catalog; and outputting information identifying the at least one asset with which the first asset was associated.

In some embodiments, the computer network addressing information indicates at least one value for at least one network parameter, the at least one network parameter selected from the group consisting of: a hostname for the first asset on the at least one computer network, an IP address for the first asset on the at least one computer network, and a MAC address for the first asset.

In some embodiments, generating the signature of the first asset comprises generating a string representation of at least some of the computer network addressing information.

In some embodiments, generating the string representation comprises: identifying network parameter values in the computer network addressing information; and concatenating the network parameter values to generate the string representation.

In some embodiments, generating the signature of the first asset comprises generating a numeric representation of at least some of the computer network addressing information.

In some embodiments, generating the numeric representation of the at least some of the computer network addressing information is performed using a character embedding technique.

In some embodiments, generating the numeric representation of the at least some of the computer network addressing information comprises: generating an initial numeric representation by applying the character embedding technique to the at least some of the computer network addressing information; and providing the initial numeric representation as input to at least one trained machine learning model to obtain the numeric representation, wherein the numeric representation is a lower-dimensional representation than the initial numeric representation.

In some embodiments, the at least one trained machine learning model comprises at least one autoencoder.

In some embodiments, applying the LSH technique to the signature of the first asset comprises applying a min-hash technique to the signature of the first asset.

In some embodiments, applying the min-hash technique to the signature of the first asset comprises: generating a plurality of shingles from the signature of the first asset; obtaining a plurality of hashes by hashing the plurality of shingles using one or more hashing functions; permuting the plurality of hashes to obtain a permuted plurality of hashes; selecting a first threshold number of hashes in the permuted plurality of hashes; and generating the hashed signature of the first asset using the selected hashes.

In some embodiments, the permuting comprises sorting the plurality of hashes numerically to obtain the permuted plurality of hashes.

In some embodiments, the permuting comprises permuting the plurality hashing randomly.

In some embodiments, applying the LSH technique to the signature of the first asset comprises encoding the numeric representation using a plurality of randomized hyperplanes.

In some embodiments, encoding the numeric representation using the plurality of randomized hyperplanes, comprises: generating the hashed signature of the first asset as a binary encoding of the numeric representation, the binary encoding specifying, for each particular hyperplane of the plurality of randomized hyperplanes, a side of the particular hyperplane on which the numeric representation falls.

In some embodiments, the associating comprises using a Jaccard index to compare the hashed signature of the first asset with at least one hashed signature of the at least one asset in the asset catalog.

In some embodiments, the associating comprises calculating a Hamming distance between the hashed signature of the first asset and at least one hashed signature of the at least one asset in the asset catalog.

In some embodiments, the at least one asset consists of a single asset in the asset catalog.

In some embodiments, the at least one asset comprises multiple assets in the asset catalog, and wherein the associating comprises: comparing the signature of the first asset with signatures of each of the multiple assets in the asset catalog; and associating the first asset with a particular one of the multiple assets based on results of the comparing.

In some embodiments, generating the signature of the first asset comprises generating a first numeric representation of at least some of the computer network addressing information, and the comparing comprises comparing the first numeric representation with numeric representations of the multiple assets.

In some embodiments, generating the first numeric representation is performed using a character embedding technique.

In some embodiments, generating the first numeric representation comprises: generating an initial numeric representation by applying the character embedding technique to the at least some of the computer network addressing information; and providing the initial numeric representation as input to at least one trained machine learning model to obtain the numeric representation, wherein the numeric representation is a lower-dimensional representation than the initial numeric representation.

In some embodiments, the event related to the first asset comprises: a communication from the first asset, a communication directed to the first asset, or a communication identifying the first asset.

In some embodiments, the first asset is a physical device addressable on the at least one computer network.

In some embodiments, the first asset is a virtual device addressable on the at least one computer network.

In some embodiments, the virtual device is a container or a virtual machine.

In some embodiments, the method further comprises: identifying a policy associated with the identified at least one asset; and processing the event related to the first asset in accordance with the identified policy.

In some embodiments, the event comprises a request to access the first asset, the method further comprising: determining whether access to the first asset is permitted under the identified policy; and when access to the first asset is to be granted under the identified policy, permitting access to the first asset, and when access to the first asset is to be denied under the identified policy, blocking access to the first asset.

In some embodiments, the event is a communication from the first asset, the method further comprising: determining an identifier associated with the first asset; and blocking the communication when the identifier is inconsistent with the identifier dictated by the identified policy.

Some embodiments provide for a method for associating assets related to events detected in at least one computer network with respective assets in an asset catalog for the at least one computer network, the asset catalog assets being addressable on the at least one computer network, the method comprising using at least one computer hardware processor to perform: while monitoring activity on the at least one computer network, obtaining information about an event related to a first asset, the information specifying computer network addressing information for the first asset; generating a signature of the first asset from the computer network addressing information using at least one trained machine learning model, wherein the signature comprises a numeric representation of the first asset; associating the first asset with at least one asset in the asset catalog using the signature of the first asset and at least one signature of the at least one asset in the asset catalog, wherein the at least one signature of the at least one asset was previously determined using the at least one trained machine learning model; and outputting information identifying the at least one asset with which the first asset was associated.

Some embodiments provide for comprising: at least one computer hardware processor; and at least one non-transitory computer-readable storage medium storing processor executable instructions that, when executed by the at least one computer hardware processor, cause the at least one computer hardware processor to perform a method for associating assets related to events detected in at least one computer network with respective assets in an asset catalog for the at least one computer network, the asset catalog assets being addressable on the at least one computer network, the method comprising: while monitoring activity on the at least one computer network, obtaining information about an event related to a first asset, the information specifying computer network addressing information for the first asset; generating a signature of the first asset from the computer network addressing information using at least one trained machine learning model, wherein the signature comprises a numeric representation of the first asset; associating the first asset with at least one asset in the asset catalog using the signature of the first asset and at least one signature of the at least one asset in the asset catalog, wherein the at least one signature of the at least one asset was previously determined using the at least one trained machine learning model; and outputting information identifying the at least one asset with which the first asset was associated.

Some embodiments provide for at least one non-transitory computer-readable storage medium storing processor executable instructions that, when executed by at least one computer hardware processor, cause the at least one computer hardware processor to perform a method for associating assets related to events detected in at least one computer network with respective assets in an asset catalog for the at least one computer network, the asset catalog assets being addressable on the at least one computer network, the method comprising: while monitoring activity on the at least one computer network, obtaining information about an event related to a first asset, the information specifying computer network addressing information for the first asset; generating a signature of the first asset from the computer network addressing information using at least one trained machine learning model, wherein the signature comprises a numeric representation of the first asset; associating the first asset with at least one asset in the asset catalog using the signature of the first asset and at least one signature of the at least one asset in the asset catalog, wherein the at least one signature of the at least one asset was previously determined using the at least one trained machine learning model; and outputting information identifying the at least one asset with which the first asset was associated.

In some embodiments, the associating comprises identifying a subset of assets in the asset catalog using a locality sensitive hashing (LSH) technique and comparing the signature of the first asset with signatures of assets in the subset of assets.

In some embodiments, using the LSH technique comprises applying the LSH technique to the signature of the first asset, the applying comprising applying a min-hash technique to the signature of the first asset.

In some embodiments, using the LSH technique comprises applying the LSH technique to the signature of the first asset, the applying comprising encoding the signature using a plurality of randomized hyperplanes.

In some embodiments, the computer network addressing information indicates at least one value for at least one network parameter, the at least one network parameter selected from the group consisting of: a hostname for the first asset on the at least one computer network, an IP address for the first asset on the at least one computer network, and a MAC address for the first asset.

In some embodiments, generating the signature of the first asset comprises generating a numeric representation of at least some of the computer network addressing information as the numeric representation.

In some embodiments, generating the numeric representation of the at least some of the computer network addressing information is performed using a character embedding technique.

In some embodiments, generating the numeric representation of the at least some of the computer network addressing information comprises: generating an initial numeric representation by applying the character embedding technique to the at least some of the computer network addressing information; and providing the initial numeric representation as input to the at least one trained machine learning model to obtain the numeric representation, wherein the numeric representation is a lower-dimensional representation than the initial numeric representation.

In some embodiments, the at least one trained machine learning model comprises a plurality of trained machine learning models including a first machine learning model and a second machine learning model, the initial numeric representation comprises a plurality of portions including a first portion and a second portion, and the providing further comprises: providing the first portion of the initial numeric representation as input to a first machine learning model to obtain a corresponding first output; providing the second portion of the initial numeric representation as input to a second machine learning model to obtain a corresponding second output; and generating the numeric representation u the first output and second output.

In some embodiments, the at least one trained machine learning model comprises an autoencoder.

In some embodiments, the associating comprises calculating a Hamming distance between the signature of the first asset and at least one signature of the at least one asset in the asset catalog.

In some embodiments, the at least one asset consists of a single asset in the asset catalog.

In some embodiments, the at least one asset comprises multiple assets in the asset catalog, and the associating comprises: comparing the signature of the first asset with signatures of each of the multiple assets in the asset catalog; and associating the first asset with a particular one of the multiple assets based on results of the comparing.

In some embodiments, the event related to the first asset comprises a communication from the first asset, a communication directed to the first asset, or a communication identifying the first asset.

In some embodiments, the first asset is a physical device addressable on the at least one computer network.

In some embodiments, the first asset is a virtual device addressable on the at least one computer network.

In some embodiments, the virtual device is a container or a virtual machine.

In some embodiments, the method further comprises: identifying a policy associated with the identified at least one asset; and processing the event related to the first asset in accordance with the identified policy.

Some embodiments provide for a method for verifying correctness of associations between assets related to events detected in at least one computer network and assets in an asset catalog for the at least one computer network, the asset catalog assets being addressable on the at least one computer network, the method comprising using at least one computer hardware processor to perform: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with a second set of one or more assets in the asset catalog using the hashed signature of the first asset and at least one hashed signature of the at least one asset in the asset catalog; determining whether the second set of assets includes the first set of assets; and when it is determined that the second set of assets includes the first set of assets, outputting an indication that the first asset was correctly associated with the first set of assets.

Some embodiments provide for a system comprising: at least one computer hardware processor; and at least one non-transitory computer-readable storage medium storing processor executable instructions that, when executed by the at least one computer hardware processor, cause the at least one computer hardware processor to perform a method for verifying correctness of associations between assets related to events detected in at least one computer network and assets in an asset catalog for the at least one computer network, the asset catalog assets being addressable on the at least one computer network, the method comprising: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with a second set of one or more assets in the asset catalog using the hashed signature of the first asset and at least one hashed signature of the at least one asset in the asset catalog; determining whether the second set of assets includes the first set of assets; and when it is determined that the second set of assets includes the first set of assets, outputting an indication that the first asset was correctly associated with the first set of assets.

Some embodiments provide for at least one non-transitory computer-readable storage medium storing processor executable instructions that, when executed by at least one computer hardware processor, cause the at least one computer hardware processor to perform a method for verifying correctness of associations between assets related to events detected in at least one computer network and assets in an asset catalog for the at least one computer network, the asset catalog assets being addressable on the at least one computer network, the method comprising: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information; generating, using the signature of the first asset, a hashed signature of the first asset by applying a locality sensitive hashing (LSH) technique to the signature of the first asset; associating the first asset with a second set of one or more assets in the asset catalog using the hashed signature of the first asset and at least one hashed signature of the at least one asset in the asset catalog; determining whether the second set of assets includes the first set of assets; and when it is determined that the second set of assets includes the first set of assets, outputting an indication that the first asset was correctly associated with the first set of assets.

In some embodiments, the method further comprises: when it is determined that at least one asset in the first set of assets is not part of the second set of assets, outputting an indication that the first asset was not correctly associated with the first set of assets.

In some embodiments, the computer network addressing information indicates at least one value for at least one network parameter, the at least one network parameter selected from the group consisting of: a hostname for the first asset on the at least one computer network, an IP address for the first asset on the at least one computer network, and/or a MAC address for the first asset.

In some embodiments, generating the signature of the first asset comprises generating a string representation of at least some of the computer network addressing information.

In some embodiments, generating the signature of the first asset comprises generating a numeric representation of at least some of the computer network addressing information using a character embedding technique.

In some embodiments, generating the numeric representation of the at least some of the computer network addressing information comprises: generating an initial numeric representation by applying the character embedding technique to the at least some of the computer network addressing information; and providing the initial numeric representation as input to at least one trained machine learning model to obtain the numeric representation wherein the numeric representation is a lower-dimensional representation than the initial numeric representation.

In some embodiments, applying the LSH technique to the signature of the first asset comprises applying a min-hash technique to the signature of the first asset.

In some embodiments, applying the min-hash technique to the signature of the first asset comprises: generating a plurality of shingles from the signature of the first asset; obtaining a plurality of hashes by hashing the plurality of shingles using one or more hashing functions;

permuting the plurality of hashes to obtain a permuted plurality of hashes; selecting a first threshold number of hashes in the permuted plurality of hashes; and generating the hashed signature of the first asset using the selected hashes.

In some embodiments, the permuting comprises permuting the plurality hashing randomly.

In some embodiments, applying the LSH technique to the signature of the first asset comprises encoding the numeric representation using a plurality of randomized hyperplanes.

In some embodiments, encoding the numeric representation using the plurality of randomized hyperplanes, comprises: generating the hashed signature of the first asset as a binary encoding of the numeric representation, the binary encoding specifying, for each particular hyperplane of the plurality of randomized hyperplanes, a side of the particular hyperplane on which the numeric representation falls.

In some embodiments, the at least one asset comprises multiple assets in the asset catalog, and wherein the associating comprises: comparing the signature of the first asset with signatures of each of the multiple assets in the asset catalog; and associating the first asset with a particular one of the multiple assets based on results of the comparing.

Some embodiments provide for a method for verifying correctness of associations between assets related to events detected in at least one computer network and assets in an asset catalog for the at least one computer network, the asset catalog assets being addressable on the at least one computer network, the method comprising using at least one computer hardware processor to perform: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information using at least one trained machine learning model, wherein the signature comprises a numeric representation of the first asset; associating the first asset with a second set of one or more assets in the asset catalog using the signature of the first asset and at least one signature of the at least one asset in the asset catalog, wherein the at least one signature of the at least one asset was previously determined using the at least one trained machine learning model; determining whether the second set of assets includes the first set of assets; and when it is determined that the second set of assets includes the first set of assets, outputting an indication that the first asset was correctly associated with the first set of assets.

Some embodiments provide for a system comprising at least one computer hardware processor; and at least one non-transitory computer-readable storage medium storing processor executable instructions that, when executed by the at least one computer hardware processor, cause the at least one computer hardware processor to perform a method for verifying correctness of associations between assets related to events detected in at least one computer network and assets in an asset catalog for the at least one computer network, the asset catalog assets being addressable on the at least one computer network, the method comprising: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information using at least one trained machine learning model, wherein the signature comprises a numeric representation of the first asset; associating the first asset with a second set of one or more assets in the asset catalog using the signature of the first asset and at least one signature of the at least one asset in the asset catalog, wherein the at least one signature of the at least one asset was previously determined using the at least one trained machine learning model; determining whether the second set of assets includes the first set of assets; and when it is determined that the second set of assets includes the first set of assets, outputting an indication that the first asset was correctly associated with the first set of assets.

Some embodiments provide for at least one non-transitory computer-readable storage medium storing processor executable instructions that, when executed by at least one computer hardware processor, cause the at least one computer hardware processor to perform a method for verifying correctness of associations between assets related to events detected in at least one computer network and assets in an asset catalog for the at least one computer network, the asset catalog assets being addressable on the at least one computer network, the method comprising: obtaining information specifying a first asset and a first set of one or more assets, in the asset catalog, with which the first asset was previously associated; obtaining information about an event related to the first asset, the information specifying computer network addressing information for the first asset; generating a signature of the first asset from the computer network addressing information using at least one trained machine learning model, wherein the signature comprises a numeric representation of the first asset; associating the first asset with a second set of one or more assets in the asset catalog using the signature of the first asset and at least one signature of the at least one asset in the asset catalog, wherein the at least one signature of the at least one asset was previously determined using the at least one trained machine learning model; determining whether the second set of assets includes the first set of assets; and when it is determined that the second set of assets includes the first set of assets, outputting an indication that the first asset was correctly associated with the first set of assets.

In some embodiments, when it is determined that at least one asset in the first set of assets is not part of the second set of assets, outputting an indication that the first asset was not correctly associated with the first set of assets.

In some embodiments, the associating comprises identifying a subset of assets in the asset catalog using a locality sensitive hashing (LSH) technique and comparing the signature of the first asset with signatures of assets in the subset of assets.

In some embodiments, using the LSH technique comprises applying the LSH technique to the signature of the first asset, the applying comprising applying a min-hash technique to the signature of the first asset.

In some embodiments, using the LSH technique comprises applying the LSH technique to the signature of the first asset, the applying comprising encoding the signature using a plurality of randomized hyperplanes.

In some embodiments, the computer network addressing information indicates at least one value for at least one network parameter, the at least one network parameter selected from the group consisting of: a hostname for the first asset on the at least one computer network, an IP address for the first asset on the at least one computer network, and a MAC address for the first asset.

In some embodiments, generating the signature of the first asset comprises generating a numeric representation of at least some of the computer network addressing information as the numeric representation using a character embedding technique.

In some embodiments, generating the numeric representation of the at least some of the computer network addressing information comprises: generating an initial numeric representation by applying the character embedding technique to the at least some of the computer network addressing information; and providing the initial numeric representation as input to the at least one trained machine learning model to obtain the numeric representation, and the numeric representation is a lower-dimensional representation than the initial numeric representation.

In some embodiments, the at least one trained machine learning model comprises a plurality of trained machine learning models including a first machine learning model and a second machine learning model, the initial numeric representation comprises a plurality of portions including a first portion and a second portion, and the providing further comprises: providing the first portion of the initial numeric representation as input to a first machine learning model to obtain a corresponding first output; providing the second portion of the initial numeric representation as input to a second machine learning model to obtain a corresponding second output; and generating the numeric representation using the first output and second output.

In some embodiments, the at least one trained machine learning model comprises an autoencoder.

In some embodiments, the associating comprises calculating a Hamming distance between the signature of the first asset and at least one signature of the at least one asset in the asset catalog.

In some embodiments, the at least one asset consists of a single asset in the asset catalog.

In some embodiments, the at least one asset comprises multiple assets in the asset catalog, and the associating comprises: comparing the signature of the first asset with signatures of each of the multiple assets in the asset catalog; and associating the first asset with a particular one of the multiple assets based on results of the comparing.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
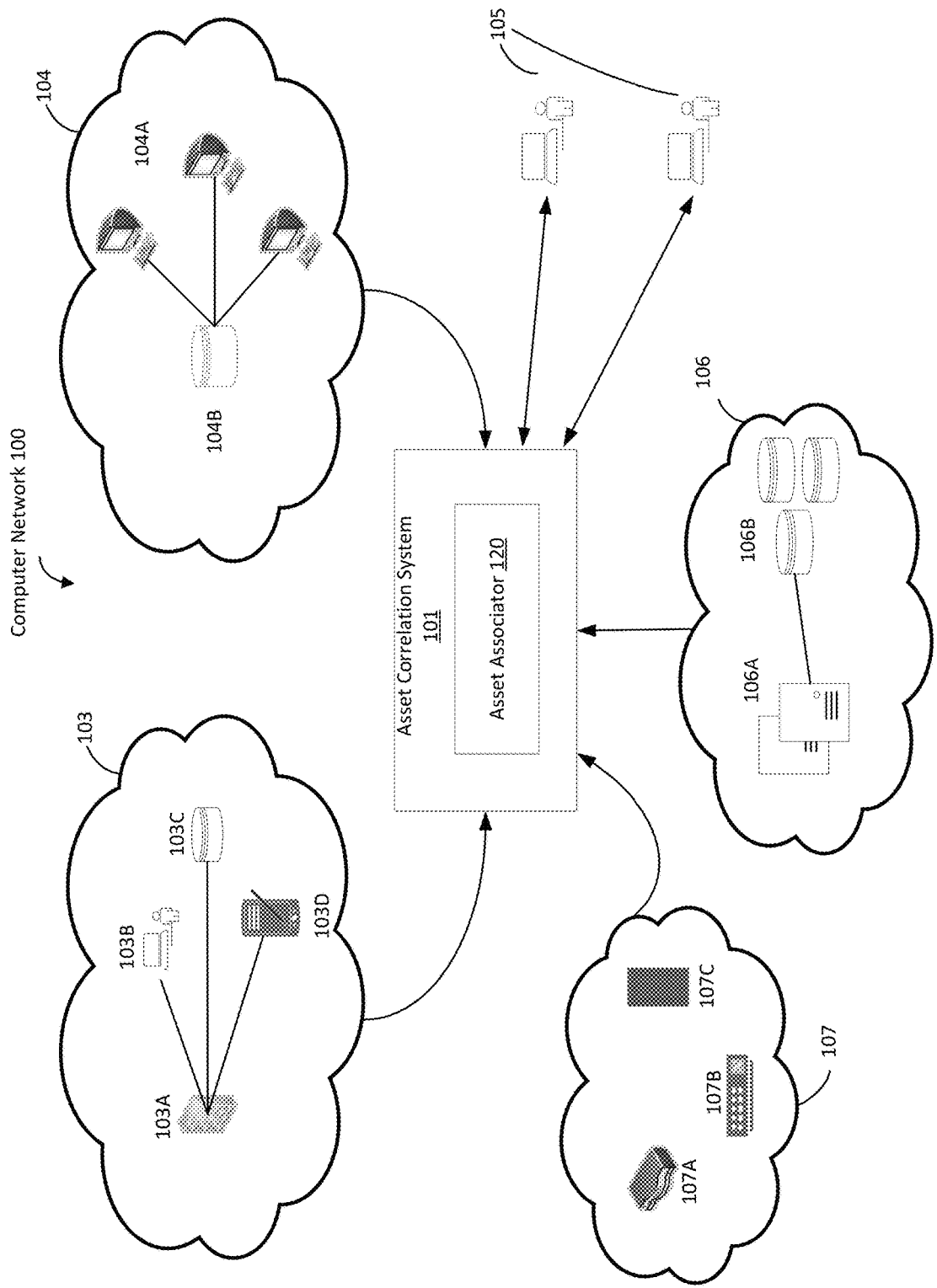
FIG. 1A shows an illustrative environment in which an asset correlation system may operate, in accordance with some embodiments of the technology described herein.

An asset of a computer network may be any addressable physical or virtual device on the computer network. An asset may have one or multiple addresses on the computer network. Each address may be of any suitable type and may be used to enable communication to/from the device on the computer network. Non-limiting examples of addresses include an IP address (e.g., an IPv4 or an IPv6 address), a MAC address, an FTP address, an HTTP address, and a hostname. As can be appreciated from the foregoing, when a device has multiple addresses, different addresses may be used to enable communication to/from the device using different communication protocols. Though, some communication protocols may require use of multiple addresses (e.g., IP address and MAC address). Some types of addresses may be assigned by a network (e.g., an IP address). Other types of addresses are not assigned by the network and are particular to a device (e.g., a MAC address).

Examples of computer network assets which are physical devices include any network-enabled physical device including any network-enabled portable device and any network-enabled fixed device. Non-limiting examples of network-enabled portable devices include a smartphone, a smartwatch, a tablet computer, a laptop, a speaker, a printer, a camera, or any other suitable network-enabled mobile device. Non-limiting examples of network-enabled fixed device include a desktop computer, a rack-mounted computer, a server, a network switch, a network router, or any other network-enabled piece of equipment (e.g., a large printer, a copy machine, a refrigerator, etc.). Internet of Things (IoT) devices such as smart home devices (e.g., smart refrigerators, doorbells, cameras, thermostats, vehicles, security systems) are also examples of physical assets of a computer network.

Examples of computer network assets which are virtual devices include virtual machines and containers. Virtual machines may virtualize an entire machine down to the hardware layers. Containers may virtualize only software layers above the operating system level.

A single physical device may include multiple assets. For example, a computer with two ethernet cards, each being separately addressable, includes two physical assets. As another example, a computer running multiple virtual machines, each being separately addressable, includes multiple virtual assets.

An event on a computer network is any collection of data resulting from any activity in a computer network involving at least one asset of the computer network. For example, an event may comprise a communication directed to one or more assets of the computer network. That communication may originate from an asset in the computer network or externally to the computer network. As another example, an event may comprise a communication from an asset on the computer network. That communication may be directed to one or more other assets in the computer network or to one or more assets external to the computer network. As yet another example, an event may involve a communication identifying one or more assets in the computer network. As yet another example, an event may comprise data generated by network hardware and/or software (e.g., a firewall, a network switch, a security agent running on device(s) (e.g., a virus scanner), etc.) in connection with one or more assets on the computer network.

A communication to an asset may be a request to obtain information from the asset, provide information to the asset, a command (e.g., a command to invoke a function via an API call or any other suitable interface), and/or any packet(s) of data (in any format and in accordance with any protocol) sent to the asset. Similarly, a communication from an asset may be a request to obtain information from one or more other assets, provide information to the other asset(s), a command (e.g., a command to invoke a function via an API call or any other suitable interface), and/or any packet(s) of data (in any format and in accordance with any protocol) sent to the one or more other asset(s). A communication identifying one or more assets in the computer network may be any communication containing data identifying one or more assets (e.g., by their addresses). For example, such a communication may be sent by a network monitoring system (e.g., a vulnerability management system that scans the network for vulnerabilities, an intrusion detection system, or a firewall) and may identify assets detected as being involved in certain activity by the network monitoring system (e.g., the communication may identify assets that have vulnerabilities such as old versions of software, computer viruses, or improperly configured software).

As described above, computer networks interconnect a large number of assets. For example, a computer network may interconnect millions, tens of millions, or even hundreds of millions of assets addressable on the computer network. For instance, an internal computer network of a large multinational business with tens of thousands of employees may interconnect millions or tens of millions of assets. Such a large number of assets generates a substantial amount of network traffic on the computer network. Indeed, a computer network with millions of assets may see billions of network events in a matter of seconds.

Notwithstanding the huge amount of network traffic, monitoring network events and traffic is important for various applications including intrusion detection, vulnerability management, detecting malicious user behavior, monitoring and analyzing user behavior patterns, and many other applications both in cybersecurity and beyond. In particular, monitoring events on a computer network (e.g., in real time) allows for various actions to be taken. For example, a firewall can block communication between an asset on the computer network and one or more devices outside of the computer network. As another example, an IDR system can detect and block malicious users from accessing the computer network. As another example, a vulnerability management system can detect weaknesses in the computer network that may be exploited (e.g., outdated software, improperly installed or configured software, computer viruses, etc.). Performing such monitoring in real-time and at scale in large computer networks is a challenge. As one example, in some deployments, a firewall or intrusion detection and response (IDR) software may have to process hundreds of millions of requests per minute.

In order to take actions based on data gathered by monitoring computer network events, an important technical problem has to be solved—the problem of accurately identifying the computer network assets implicated by the events observed on the computer network. This problem is sometimes termed the "asset correlation" problem. In a typical deployment, a network monitoring system (e.g., a firewall, an IDR system, or a vulnerability management system) has access to a list of computer network assets. During operation, the network monitoring system may observe an event and need to determine which asset in the list of assets is implicated by the event in order to determine what action to take. In other words, the network monitoring system needs to associate or correlate the network asset(s) related to the network event to a network asset or assets in the list of assets. For example, when a network event is related to some particular asset (e.g., the event is communication to or from or otherwise relating to the particular asset), the network monitoring system needs to associate the particular asset with some asset in its list of assets. In this context, as part of asset correlation, the network event or the particular asset (or both) may be associated with some asset(s) in the list of assets.

Identifying the implicated asset correctly is important because different actions may be taken based the identity of that asset. As one example, a firewall may take different actions based on the identity of an identified asset. Suppose, for instance, that a firewall detects an event that is a communication request (e.g., originating from outside of the network) to access data hosted by an asset on the computer network. Depending on the identity of the asset to which access is requested, the firewall may grant or deny the request. More generally, a firewall may implement one or more rules and/or policies (a policy may be a collection of one or more rules) for controlling access to network assets, and different rules and/or policies may apply to different assets such that the accurate identity of an asset is needed to identify the relevant rule and/or policy, which in turn dictates what actions the firewall should take for various events. Similarly, other network monitoring systems may implement different rules and/or policies for different assets and, upon observing network events, need to identify the network assets implicated by the network events prior to determining what actions to take in response to those events (e.g., by selecting, based on the identity of the network assets implicated by the events, the rules and/or policies that dictate the actions to take).

Another example of the asset correlation problem in the cybersecurity setting is in the context of vulnerability management. In a typical deployment, a vulnerability management system scans a computer network that it monitors to build a catalog of assets and then monitors the network. As network events arise, the vulnerability management system will endeavor to associate assets related to the events on the network with assets in the asset catalog.

It is important not only to accurately identify network assets implicated by network events, but also to do so very quickly to keep up with the volume of network events occurring in a short span of time. For example, as described above, a firewall product may process hundreds of millions of network events per minute (e.g., 200, 300, 400, 500, or more than 500 million requests, for example requests to access assets, per minute).

The inventors have recognized that conventional techniques for performing asset correlation suffer from various drawbacks and can be improved upon.

One conventional technique for performing asset correlation involves: (1) observing a network event (e.g., a request to access a network asset); (2) obtaining some identifying information about a network asset related to the event (e.g., the network asset to which access is requested) such as a hostname or an IP address or a MAC address of the network asset; (3) creating a database query using the identifying information and executing the database query to find matching assets in an asset catalog. A variation of this conventional technique is to implement it sequentially by first querying for matches using only some identifying information (e.g., hostname only), then querying among those matches using further identifying information (e.g., IP address), then performing even further querying if needed (e.g., using a MAC address) and so on.

These conventional techniques for asset correlations simply cannot be used to process network events at a level of throughput needed by many real-world network monitoring systems (e.g., real-world firewalls and IDS systems must process millions of requests per second and/or hundreds of millions of requests per minute). One reason for this is that the above-described conventional techniques for performing asset correlation involve performing database queries for every observed network event. Executing database queries requires locking of data in the database (e.g., locking access to a table storing a list of computer network assets and their respective hostnames, IP addresses and/or MAC addresses), and such an architecture (e.g., involving locking of the table for every access so that the table is not changed during the access) cannot support a throughput of millions of requests per second—the overhead, per operation, is too high. Moreover, the list of assets in a computer network changes all the time, for example, as devices are added to or removed from the computer network, and updating the list of assets requires further accesses to the database to update the asset table(s), further limiting access to the list of assets stored in these table(s). Although the database-query-based conventional techniques could be used in smaller networks (e.g., having hundreds of assets and moderate traffic), they cannot be scaled to have the level of throughput required for modern-day network monitoring applications for moderate or large computer networks.

Another issue with conventional techniques for asset correlation is that different network monitoring systems define assets differently—there is not a common, agreed-upon way for doing so. As a result, different network monitoring systems manage their own lists of assets and correlate against those lists. For example, a firewall product may manage its own asset list and associate assets related to network events to entries in the list based on the IP addresses of the assets. At the same time, a vulnerability management product may manage its own asset list and associate assets related to network events to entries in the list based on the hostnames of the assets. As such, the lists of assets managed by different network monitoring systems are not synchronized and, depending on the way that each network monitoring system defines an asset, may be very different lists. This leads to multiple problems including inconsistent asset correlation results, different asset lists across different security products monitoring the same underlying computer network, redundant storage of information across the network, and additional processing (e.g., comparisons) where not needed.

In part to address the above-described problems with conventional asset correlation techniques, the inventors have developed new techniques for performing asset correlation. Unlike conventional asset correlation techniques, the techniques developed by the inventors substantially reduce the computational demands involved with database querying of computer network asset lists and subsequent processing of the query results (e.g., by comparing a signature of some particular computer network asset related to event with the assets in the list of assets returned by a database query). As described below, the search space is reduced by several orders of magnitude. And, as a result, the techniques developed by the inventors scale to processing millions (e.g., tens or hundreds of millions) of events per minute, as may be required in some networking monitoring applications (e.g., firewall and/or intrusion detection and response systems). Further, the techniques developed by the inventors may be implemented as part of a service on a computer network that may be accessed (e.g., via API calls) by other network monitoring systems on the computer network. In this way, the other networking systems neither need to implement their own asset correlation algorithms nor manage their own asset lists, which reduces redundancy and inefficiency that results from storing numerous different asset lists and running comparisons against all of them (not to mention, the inconsistent and potentially incorrect conclusions that would result). Moreover, even if existing network monitoring systems were to nonetheless retain their own asset correlation logic, the system developed by the inventors may operate as a verification service to promote consistency and accuracy and can operate (e.g., via appropriate API calls) to verify correctness of asset associations made by network monitoring systems on their own.

In some embodiments, the asset correlation techniques developed by the inventors involve using locality sensitive hashing (LSH) techniques. Regular hashing functions (e.g., MD5, SHA-1, SHA-2, etc.) are designed to reduce collisions so that the hashes of two similar objects are different from one another. On the other hand, locality sensitive hashing techniques involve generating hashes such that the hashes of two similar objects are also similar or the same. As a result, LSH techniques may be used to generate hashes that may be compared against other hashes (e.g., using a suitable measure of similarity such as, for example, Hamming distance) to see how similar different objects may be. Different locality sensitive hashing techniques may be employed by the technology developed by inventors, in different embodiments. For example, as described herein, in some embodiments, a minimum hashing LSH technique may be employed. As another example, as described herein, in some embodiments, an LSH technique based on randomized hyperplanes may be employed.

In some embodiments, as part of the asset correlation techniques developed by the inventors, the locality hashing techniques may be applied to asset signatures. For example, an LSH technique may be applied to an asset signature for a particular asset related to a particular network event, and the resulting hashed asset signature may be compared with hashed asset signatures of assets in an asset catalog for the computer network to identify one or more assets in the asset catalog with which to associate the particular asset related to the network event.

The use of locality sensitive hashing, as described herein, provides a substantial reduction in computation required to perform asset correlation. As described above, the magnitude of the search space is reduced by an order of magnitude. For example, suppose that the computer network asset list has N entries (e.g., N=10 million entries). Conventional asset correlation techniques involve, for every asset correlation to be performed, to pull the entire list and compare an asset in question with each of the N entries; this means performing N comparisons, which has complexity of O(N). With the locality sensitive hashing techniques, however, each of the N asset list entries would be mapped, by the hashing scheme, to one of N/K hashes (e.g., when K=1000, there would be 10,000 different hashes, with about 1,000 assets all having the same or similar hash). Then the hash of a particular asset would need to be compared to the N/K different hashes to identify the "bucket" of potentially matching assets. Then only about K comparisons need to be performed to identify the specific asset in the asset list that matches the particular asset (related to an event) for which the asset correlation is being performed. Thus, using the techniques described herein, for every asset correlation to be performed, the computational complexity of identifying a corresponding is O(N/K+K). Thus, the computational savings are several orders of magnitude (on the order of K).

In some embodiments, an asset signature for a particular asset may be generated from computer network addressing information for the particular asset. Computer network addressing information for an asset of a computer network may include any information used to address the asset on the computer network. As such, the computer network addressing information may include one or more addresses for the asset. For example, computer network addressing information for an asset may indicate a value for each of one or more network parameters of the asset such as a MAC address, an IP address, a hostname. Additionally or alternatively, computer network addressing information for an asset may include information about hardware (e.g., name, version, driver information, CPU architecture) in the asset and/or software executing on the asset (e.g., name and version of any software application or operating system). Additionally or alternatively, computer network addressing information for an asset may include information related to a domain of the asset, group IP address for the asset, and/or a sub-networks including the asset (e.g., user defined sub-networks). Additionally or alternatively, computer network addressing information for an asset may include temporal and/or location information related to the asset (e.g., when and where the asset was previously accessed (e.g., first accessed, last accessed, etc.) on the computer network).

As described herein, in some embodiments, an asset signature for a particular asset may be a string representation comprising one or more strings representing at least some of the computer network addressing information. For example, in some embodiments, the string representation of a particular asset may comprise a string generated by concatenating the hostname, IP address, and MAC address of the asset.

In some embodiments, the asset signature for a particular asset may be a numeric representation. The numeric representation may be obtained by transforming a string representation of a particular asset to a corresponding numeric representation (e.g., a vector of numbers). This may be done in any suitable way and, for example, may be done by applying a character embedding technique to each of the characters of the string representation. Examples of such embedding techniques are provided herein.

In some embodiments, the numeric asset signature may be mapped to a lower-dimensional numeric asset signature using a dimensionality reduction technique. In some embodiments, that technique may involve using at least one trained machine learning model to map the numeric asset signature to a lower-dimensional asset signature. For example, the at least one trained machine learning model may comprise one or multiple autoencoders, each of which comprises a respective encoder that maps input to a lower-dimensional representation (e.g., in the latent space of the autoencoder) and a decoder that maps the lower-dimensional representation back to the original space in an attempt to recover the original input to the encoder. The encoder(s) may be used to reduce the dimensionality of the numeric asset signature provided as input to the autoencoder(s). The lower-dimensional numeric signature may be considered to be a data-driven (or learned) representation of an asset signature (by contrast to a manually designed signature).

The locality sensitive hashing and machine learning techniques may be combined in various ways, as described herein. As one example, locality sensitive hashing may be used to identify a group of candidate assets in an asset catalog that may be associated with a particular asset related to a network event. In turn, a numeric signature of the particular asset (e.g., determined used a trained autoencoder) may be compared to numeric signatures of the assets in the identified group (also determined using the trained autoencoder) to select the specific asset in the catalog with which to associate the particular asset. As another example, locality sensitive hashing may be applied to a string representation of an asset signature or to a numeric representation of the asset signature (e.g., to a numeric representation determined using the trained autoencoder).

Accordingly, the inventors have developed techniques for associating events detected in at least one computer network with respective assets in an asset catalog for the at least one computer network, with the asset catalog assets being addressable on the at least one computer network. The techniques include: (1) while monitoring activity on the at least one computer network, obtaining information about an event related to a first asset (e.g., a physical asset or a virtual asset), the information specifying computer network addressing information for the first asset; (2) generating a signature (e.g., comprising a string representation or a numeric representation) of the first asset from the computer network addressing information; (3) generating, using the signature of the first asset, a hashed signature of the first asset by applying a locality sensitive hashing (LSH) technique (e.g., a minhash technique or a randomized hyperplanes technique) to the signature of the first asset; (4) associating (e.g., using a suitable measure of similarity, for example, Jaccard Index or Hamming distance) the first asset with at least one asset in the asset catalog using the hashed signature of the first asset and at least one hashed signature of the at least one asset in the asset catalog; and (5) outputting information identifying the at least one asset with which the first asset was associated.

In some embodiments, the computer network addressing information indicates at least one value for at least one network parameter selected from among: a hostname for the first asset on the at least one computer network, an IP address for the first asset on the at least one computer network, and a MAC address for the first asset.

In some embodiments, generating the signature of the first asset comprises generating a string representation of at least some of the computer network addressing information. This may be done by: (1) identifying network parameter values in the computer network addressing information; and (2) concatenating the network parameter values to generate the string representation.

In some embodiments, generating the signature of the first asset comprises generating a numeric representation of at least some of the computer network addressing information. The numeric representation may be generated using a character embedding technique, using one-hot-encoding, or in any other suitable way. In some embodiments, a numeric representation so obtained may be processed using a dimensionality reduction technique. For example, an initial numeric representation obtained using a character embedding technique may be provided as input to at least one trained machine learning model (e.g., a trained autoencoder) to obtain a lower-dimensional numeric representation.

In some embodiments, applying the LSH technique to the signature of the first asset comprises applying a min-hash technique to the signature of the first asset. Applying the min-hash technique may involve: (1) generating a plurality of shingles from the signature of the first asset; (2) obtaining a plurality of hashes by hashing the plurality of shingles using one or more hashing functions (e.g., MD-5, SHA-2, etc.); permuting (e.g., sorting or randomly permuting) the plurality of hashes to obtain a permuted plurality of hashes; (3) selecting a first threshold number of hashes in the permuted plurality of hashes; and (4) generating the hashed signature of the first asset using the selected hashes.

In some embodiments, applying the LSH technique to the signature of the first asset comprises encoding the numeric representation using a plurality of randomized hyperplanes (e.g., 2, 4, 8, 16, 32, 64 hyperplanes). Such encoding may include generating the hashed signature of the first asset as a binary encoding of the numeric representation, the binary encoding specifying, for each particular hyperplane of the plurality of randomized hyperplanes, a side of the particular hyperplane on which the numeric representation falls.

In some embodiments, as a consequence of using hashed signatures, the first asset may be associated with exactly one asset in the asset catalog. In other embodiments, as a consequence of using hashed signatures, the first asset may be associated with a group of multiple assets in the asset catalog. In that circumstance, the (non-hashed) signature of the first asset may be compared with the (non-hashed) signatures of the assets in the group of assets to identify a particular asset with which to associate the first asset.

In some embodiments, the event related to the first asset comprises: a communication from the first asset, a communication directed to the first asset, or a communication identifying the first asset.

In some embodiments, after at least one asset with which to associate the first asset is identified, the techniques further involve: (1) identifying a policy associated with the identified at least one asset; and (2) processing the event related to the first asset in accordance with the identified policy. For example, when the event comprises a request to access the first asset, the techniques further involve: (1) determining whether access to the first asset is permitted under the identified policy; (2) when access to the first asset is to be granted under the identified policy, permitting access to the first asset, and (3) when access to the first asset is to be denied under the identified policy, blocking access to the first asset. As another example, when the event is a communication from the first asset, the techniques further involve: (1) determining an identifier (e.g., a unique identifier, a version number) associated with the first asset; and (2) blocking the communication when the identifier is inconsistent with the identifier dictated by the identified policy.

In some embodiments, the techniques, developed by the inventors, for associating events detected in at least one computer network with respective assets in an asset catalog for the at least one computer network involve: (1) while monitoring activity on the at least one computer network, obtaining information about an event related to a first asset, the information specifying computer network addressing information for the first asset; (2) generating a signature of the first asset from the computer network addressing information using at least one trained machine learning model, wherein the signature comprises a numeric representation of the first asset; (3) associating the first asset with at least one asset in the asset catalog using the signature of the first asset and at least one signature of the at least one asset in the asset catalog, wherein the at least one signature of the at least one asset was previously determined using the at least one trained machine learning model; and (4) outputting information identifying the at least one asset with which the first asset was associated.

In some such embodiments, the association may be performed using the signatures generated by the at least one trained machine learning model, but without using locality sensitive hashing techniques. In other embodiments, the associating comprises identifying a subset of assets in the asset catalog using a locality sensitive hashing (LSH) technique (e.g., by using a min-hash technique or a randomized hyperplanes technique) and comparing the signature of the first asset with signatures of assets in the subset of assets.

As described herein, in some embodiments, the asset correlation techniques developed by the inventors may be used to verify correctness of previously-made associations between assets related to events detected in at least one computer network and assets in an asset catalog for the at least one computer network. Accordingly, in some embodiments, the verification involves: (1) obtaining information specifying a first asset and a first set of one or more assets, in the asset catalog, with which the first asset was previously associated; (2) obtaining information about an event related to the first asset, the information specifying computer network addressing information for the first asset; (3) generating a signature of the first asset from the computer network addressing information; (4) generating, using the signature of the first asset, a hashed signature of the first asset by applying a locality sensitive hashing (LSH) technique to the signature of the first asset; (5) associating the first asset with a second set of one or more assets in the asset catalog using the hashed signature of the first asset and at least one hashed signature of the at least one asset in the asset catalog; (6) determining whether the second set of assets includes the first set of assets; and (7) when it is determined that the second set of assets includes the first set of assets, outputting an indication that the first asset was correctly associated with the first set of assets.

In some embodiments, the verification involves: (1) obtaining information specifying a first asset and a first set of one or more assets, in the asset catalog, with which the first asset was previously associated; (2) obtaining information about an event related to the first asset, the information specifying computer network addressing information for the first asset; (3) generating a signature of the first asset from the computer network addressing information using at least one trained machine learning model, wherein the signature comprises a numeric representation of the first asset; (4) associating the first asset with a second set of one or more assets in the asset catalog using the signature of the first asset and at least one signature of the at least one asset in the asset catalog, wherein the at least one signature of the at least one asset was previously determined using the at least one trained machine learning model; (5) determining whether the second set of assets includes the first set of assets; and (6) when it is determined that the second set of assets includes the first set of assets, outputting an indication that the first asset was correctly associated with the first set of assets.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A shows an illustrative environment in which an asset correlation system may operate, in accordance with some embodiments of the technology described herein. The environment includes computer network 100 that includes multiple assets addressable on the computer network 100. The computer network 100 includes any suitable numbers of assets and, for example, may include thousands, millions, tens of millions, hundreds of millions, or billions, of addressable assets. The computer network 100 may be a computer network operated by a business (e.g., a small business, a large business with multiple physical locations, including multinational businesses employing tens or hundreds of thousands of people).

In the illustrative example of FIG. 1A, the computer network 100 includes sub-networks 103, 104, 106, and 107, each comprising assets 103A-D, 104A-B, 106A-B, and 107A-C, respectively. As shown in FIG. 1A, sub-network 103 includes personal laptop 103B, database 103C, and mobile device 103D connected to a firewall 103A. The firewall 103A serves as a security device, in hardware or software form, that acts as an intermediary between the sub-network 103's network assets and the computer network 100. Sub-network 103 may include any number of network assets and may utilize any number of firewalls in any suitable configuration as determined by the users of the sub-network 103. As shown in FIG. 1A, sub-network 104 includes computers 104A connected to database 104B, sub-network 106 includes databases 106B in communication with servers 106A, and sub-network 107 includes devices such as router 107A, internet modem 107B, and server 107C.

It should be appreciated that computer network 100 may have any suitable number of sub-networks, each having any suitable number of assets, as the illustration in FIG. 1A is merely an example. The assets in each sub-network may be configured to communicate with one or more other assets in the sub-network and/or one or more other assets in the computer network 100 (including, e.g., assets in other sub-networks). Any asset in computer network 100 that is addressable on computer network 100 may also be part of a sub-network and may be addressable uniquely on that that sub-network.

In some embodiments, computer network 100 may include one or more assets not part of any sub-network, as aspects of the technology described herein are not limited in this respect. In the illustrative example of FIG. 1A, computer network 100 includes computers 105. Users of computers 105 may be any suitable users on computer network 100. For example, a user of computer 105 may be an administrator or other user interfacing with asset correlation system 101 (e.g., to configure, maintain, and/or use asset correlation system 101).

The assets in each of the sub-networks may be connected to one another in any suitable way using one or more wired connections, one or more wireless connections, or any suitable combination thereof. Similarly, the sub-networks within the computer network may be configured to communicate with one another in any suitable way using one or more wired connections, wireless connections, and/or any suitable combination thereof. Computer network traffic (e.g., packets or traffic in any other suitable format) on the computer network 100 may be transmitted in accordance with any suitable network protocol(s), non-limiting examples of which include the transmission control protocol TCP, the internet protocol (IP, e.g., IPv4, IPv6, etc.) (together, TCP/IP), and the user datagram protocol (UDP).

Also, as shown in FIG. 1A, computer network 100 includes asset correlation system 101, which may be used to facilitate monitoring assets and/or network traffic on computer network 100. For example, asset correlation system 101 may facilitate monitoring network traffic to one or more assets of computer network 100 (e.g., traffic originating from computer network 100 and/or traffic originating outside of computer network 100). As another example, asset correlation system 101 may facilitate monitoring network traffic from one or more assets of computer network 100 (e.g., traffic originating from one or more assets in computer network 100 including traffic going to one or more other assets in the computer network 100 and/or outside of computer network 100).

In some embodiments, asset correlation system 101 may assist one or more other network monitoring systems (e.g., one or more firewalls, one or more intrusion detection systems, one or more vulnerability management systems, etc.) to monitor assets and/or network traffic of computer network 100. In some such embodiments, the asset correlation system 101 may facilitate such monitoring by associating assets related to events detected on the computer network 100 (e.g., events detected on the network by one or more other network monitoring systems) with assets of the computer network 100. To this end, the asset correlation system 101 includes asset associator 120, which is software configured to associate assets related to events with assets on computer network 100 that are registered in an asset catalog (e.g., asset catalog 162 described herein including with reference to FIGS. 1B and 1C).

In some embodiments, asset associator 120 may obtain information about an event related to some computer network asset and use the obtained information to identify one or more assets in the asset catalog with which the computer network asset is to be associated. The identification may be performed in any of the ways described herein including by using any of the locality sensitive hashing and/or machine learning techniques described herein.

In other embodiments, asset associator 120 may verify correctness of a previously-made association between an asset related to an event and a computer network asset in the asset catalog. The previously-made association may have been made by one or more other systems (e.g., one or more other network monitoring systems, examples of which are provided above) using one or more different association techniques (e.g., one of the conventional approaches described above). In some such embodiments, the asset associator 120 may be provided with information about an event related to some computer network asset and a previously-made association that includes a list of one or more potential assets with which the computer network asset is to be associated. The asset associator may then verify whether the previously-made association is correct. The verification may be performed in any of the ways described herein including using any of the LSH and/or machine learning techniques described herein.

Although, in some embodiments, asset correlation system 101 may assist one or more other network monitoring systems to monitor assets and/or network traffic of computer network 100, the asset correlation system may, additionally or alternatively, monitor assets and/or network traffic on its own (e.g., passively by observing network traffic or actively by communicating with one or more assets on the network). As part of such monitoring, the asset correlation system 101 may detect events on computer network 100 and for each event related to a respective computer network asset, associate the respective computer network asset with one or more assets in an asset catalog for the computer network.

Asset correlation system 101 may execute on one or multiple computing devices. Asset correlation system 101 and the asset associator 120 are further described herein including with reference to FIGS. 1B and 1C.

Figure 1B:
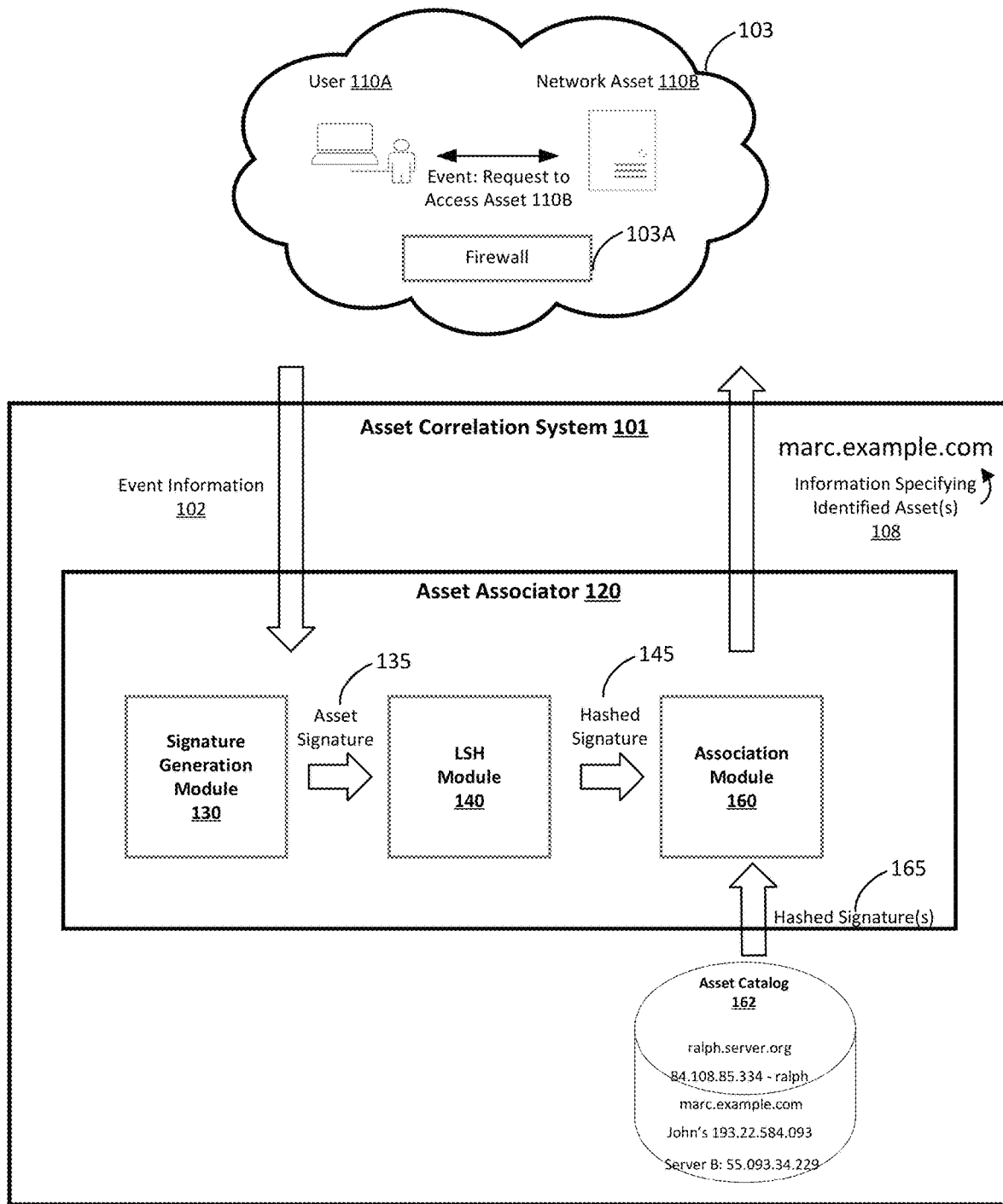
FIG. 1B shows an illustrative example of an asset correlation system associating an asset related to an event with an asset in an asset catalog for a computer network, in accordance with some embodiments of the technology described herein.

FIG. 1B shows an illustrative example of the asset correlation system 101 associating an asset related to a network event with one or more assets in an asset catalog for a computer network, in accordance with some embodiments of the technology described herein. The asset correlation system 101 monitors activities of the computer network 100 including sub-network 103. In this example, a firewall 103A detects a communication from a computer of user 110A attempting to access a network asset 110B in sub-network 103. The network monitoring system would like to associate network asset 110B to one or more assets in an asset catalog for computer network 100, for example, to determine if this access request is permitted (e.g., once the network asset is definitively identified, the network monitoring system may permit the communication to take place). In another example, the network asset 110B may have been accessed and the network monitoring system would like to determine whether such access was appropriate or not (e.g., malicious).

Accordingly, in this example, the firewall 103A generates event information 102 about the event of the attempted access to the network asset 110B. The event information includes computer network addressing information for network asset 110B, which may indicate values for one or more network parameters for network asset 110B (e.g., MAC address, IP address, hostname, etc.). In the specific example illustrated in FIG. 1B, the computer network addressing information of event information 102 comprises the hostname and IP address of the network asset 110B and the destination IP addresses of network asset 110B. Event information 102 may be in any suitable format such as a text string (e.g., a string obtained by concatenating the various network parameter values using one or more separation characters), attribute value pairs in a text or structured (e.g., XML, JSON, common log, etc.) format, as aspects of the technology described herein are not limited in this respect.

Next, the event information 102 is provided to the asset associator 120 part of the asset correlation system 101. In this example, the asset associator 120 uses the event information to identify one or more assets in the asset catalog 162 with which the computer network asset 110B is to be associated. Information specifying the identified asset(s) 108 is then output by the asset correlation system 101 and provided to the firewall 103A. In this example, the identified asset is a device hosting a web server having an associated URL of "marc.example.com."

In this example, in order to associate the network asset 110B with one or more assets in asset catalog 162, the asset associator 120: (1) determines, using signature generation module 130, an asset signature 135 for the network asset 110B from the computer network addressing information part of event information 102; (2) determines, using locality sensitive hashing module 140 and from the asset signature, a hashed signature 145 for the network asset 110B; and (3) compares, using association module 160, the hashed signature 145 with the (e.g., previously generated) hashed signature(s) 165 of at least some of the assets in the asset catalog 162. Exact or close matches (e.g., matches to within a threshold tolerance) are selected as part of identified assets by association module 160.

In some embodiments, the asset signature 135 may comprise a string representation of the computer network addressing information part of event information 102. In some embodiments, the signature generation module 130 may generate the string representation by accessing at least some (e.g., all) of the network parameter (or other) values in the computer network addressing information and concatenating these values into a single string (optionally, with one or more separator characters such as spaces, tabs, or commas between the parameter values). In this example, asset signature 135 may be generated, by module 130, by concatenating the MAC address, IP address and hostname of network asset 110B to obtain asset signature 135. In other embodiments, the network parameter values (or any other data included in the computer network addressing information) may be used to generate multiple strings and the string representation may include the multiple strings. Each string may include numeric, alphabetic, numeric and alphabetic characters, and/or symbols (e.g., punctuation, special symbols, etc.).

In other embodiments, the asset signature 135 may be a numeric representation of the computer network addressing information part of event information 102. In some embodiments, the signature generation module may generate the numeric representation by applying a character embedding technique to a string representation of the computer network addressing information. In this approach, at least some (e.g., all) of the characters in the string representation are mapped to respective numbers. Any suitable character embedding technique may be used. The character embedding technique may map a character to an integer representation (e.g., a vector of integers), a floating point representation (e.g., a vector of floating point numbers), or a mixed representation (a vector of integers and floating point numbers). For example, a look-up table may be used to map characters to a numeric representation or a one-hot encoding may be used. A one-hot encoding may produce an integer representation. As another example, the word2vec character embedding technique may be used, which may produce a floating point representation. This technique is described in "Distributed representations of words and phrases and their compositionality," Proceedings of the 26th International Conference on Neural Information Processing Systems—Volume 2, December 2013 and in "Efficient Estimation of Word Representations in Vector Space," ICLR (Workshop Poster) 2013. As another example, the GloVe character embedding technique may be used. This technique is described in "GloVe: Global Vectors for Word Representation," Proceedings of the 2014 Conference on Empirical Methods in Natural Language Processing (EMNLP). As yet another example, the fastText character embedding technique may be used. This technique is described in fastText, ("Enriching Word Vectors with Subword Information," Transactions of the Association for Computational Linguistics—Volume 5, 135-146, 2017), ("Bag of Tricks for Efficient Text Classification," Proceedings of the 15$^{th}$ Conference of the European Chapter of the Association for Computational Linguistics—Volume 2, April 2017), and ("FastText.zip: Compressing text classification models," International Conference on Learning Representations, 2017).

In some embodiments, the numeric representation (e.g., a vector having integer or floating point elements) generated by a character embedding technique may be further processed to reduce its dimensionality. In some embodiments, the dimensionality reduction may be performed by using at least one trained machine learning model (e.g., using an encoder part of a trained autoencoder to determine a lower-dimensional latent representation of the numeric representation provided as input to the autoencoder) as described herein, including with reference to FIG. 6B.

Returning to FIG. 1B, after the asset signature 135 is generated using the signature generation module 130, the asset signature 135 is processed by LSH module 140 to generate hashed signature 145 of the asset 110B. Any suitable locality sensitive hashing technique may be used to generate the hashed signature 145. For example, the min-hash technique described herein (including with reference to FIGS. 2B, 4A-4B) or the randomized hyperplane technique described herein (including with reference to FIGS. 2C, 3A-3E) may be used to generate the hashed signature 145 from asset signature 135. As further described herein, depending on the type of asset signature generated by the signature generation module 130, different types of locality sensitive hashing techniques may be used.

In turn, the association module 160 may compare the hashed signature 145 for the network asset 110B with hashed signatures of assets in asset catalog 162 for the computer network 100. Exact matches, or near matches (e.g., matches to within a threshold tolerance) may be selected as part of identified assets.

In some embodiments, the association module 160 may automatically associate assets for events with assets in the asset catalog. For example, events that based on their nature are more likely to correspond to malicious activity may be automatically associated (e.g., downloads of large files, attempts to access network assets originating from suspicious sources external to the network, attempts to access suspicious websites, etc.). On the other hand, other types of events may be logged, but not associated until a request to process such events is received by the asset associator 120. Such a request may come from a user or another software application.

The information specifying identified asset(s) 108 may be output by the asset correlation system 101 and provided to any suitable recipient. For example, the identified assets may be output to a firewall 103A (which may have detected the event in connection with network asset 110B and provided event information 102 to the asset correlation system 101). As another example, information specifying the identified asset(s) 108 may be outputted to a user, which may be an administrator and/or a user of asset correlation system 101. As another example, the information specifying the identified asset(s) 108 may be output to another software application (e.g., a third party service, an application that logs and stores such associations, etc.).

The information specifying the identified asset(s) 108 may be used in any suitable way. For example, the information may be used to determine how and whether to perform further processing in connection with the event related to network asset 110B (in this example, the event is a request to access data from network asset 110B). In the context of FIG. 1B, for example, the asset correlation system 101 may first identify a certain policy associated with the identified asset 108. The policy may specify to what extent the event related to the network asset 110B should be processed.

As one example of a policy, the policy may be used to determine whether access to the network asset 110B is permitted under the identified policy. If access to the network asset 110B is permitted under this policy, then access to the network asset may granted (e.g., by firewall 103A). On the other hand, if access is to be denied under the identified policy, then access to the network asset 110B is not granted (e.g., request to access network asset 110B is blocked). As another example of a policy, the policy may be used to ensure that software executing on various assets is as up-to-date as possible. In the context of FIG. 1B, the policy may determine an identifier associated with software executing on the network asset 110B and block communication to/from this network asset if the identifier is inconsistent with the identifier dictated by the policy. For instance, the identifier may be a version number, such as a version number of software associated with software executing on the network asset 110B. In this way, IT policies may be enforced and sensitivity to vulnerabilities may be reduced by ensuring that the most up-to-date software is being used (newer software is likely to have fewer bugs, blocked known exploits, and updated security features relative to older software).

Figure 1C:
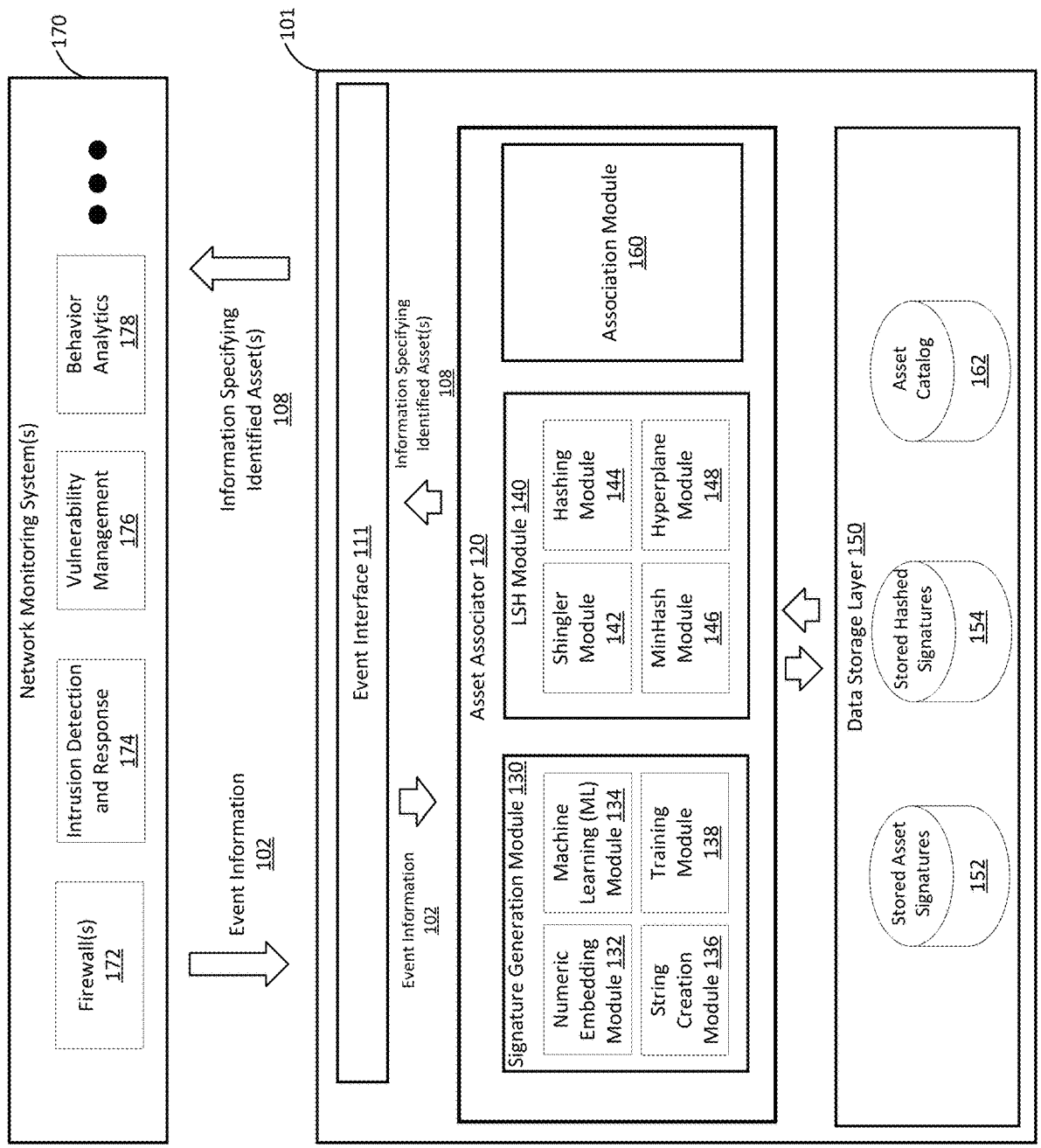
FIG. 1C is a block diagram of components of an example asset correlation system, in accordance with some embodiments of the technology described herein.

FIG. 1C is a block diagram of components of an example asset correlation system 101, in accordance with some embodiments of the technology described herein. As shown in FIG. 1C, the asset correlation system 101 includes an event interface 111 that is configured to receive, from one or more network monitoring systems 170, information about events (event information 102) associated with respective assets and, for each particular event related to a respective particular asset, output information specifying one or more assets associated with the particular asset. The asset correlation system 101 further includes asset associator 120 configured to process event information 102 and use results of said processing to identifying one or more network assets, from among assets in asset catalog 162, implicated by the event information 102. The asset correlation system 101 further includes data storage layer 150, which stores various data used for asset association, as described herein.

As described above, in some embodiments, asset correlation system 101 facilitates monitoring of computer network assets performed by one or more other network monitoring systems. In some such embodiments, the event interface 111 may receive event information 102 (for each of one or more events) from an external source such as, for example, any one of network monitoring systems 170. As shown in FIG. 1C, network monitoring systems 170 may include any of numerous types of network monitoring systems including one or more firewalls 172, an intrusion detection and response system 174, a vulnerability management system 176, and/or a behavior analytics system 178. The illustrated network monitoring systems are illustrative examples; network monitoring systems 170 may include one or more other types of network monitoring systems in addition to or instead of the systems shown in FIG. 1C. The event interface 111 may receive such information via an application programming interface (API) or in any other suitable way. Upon receipt, the event interface 111 may provide the event information to asset associator 120 for further processing.

As described above, in some embodiments, asset correlation system 101 may itself monitor computer network assets and/or network traffic. In some such embodiments, the event interface may comprise software to perform such monitoring and may generate event information 102, which may then be provided to asset associator 120 for further processing.

The event interface 111 may be provided with event information 102 to associate assets implicated by the event information with assets in the asset catalog 162. In some embodiments, such association may be performed as a service for another system (e.g., a network monitoring system) either to determine the association or to verify correctness of a previously-determined association (e.g., as described herein including with reference to FIGS. 7A-7B).

As shown in FIG. 1C, asset associator 120 comprises signature generation module 130, locality sensitive hashing (LSH) module 140, and association module 160. Each of these modules comprises further sub-modules. For example, signature generation module 130 comprises numeric embedding module 132, machine learning module 134, string creation module 136, and training module 138. LSH module 140 comprises shingler module 142, hashing module 144, minhash module 146, and hyperplane module 148. These modules are described in further detail below. It should be appreciated that the modules shown in the example of FIG. 1C are illustrative and that, in some embodiments, one or more other modules may be used in addition to or instead of the modules shown, as aspects of the technology described herein are not limited in this respect. As one example, signature generation module 130 and/or LSH module 140 may themselves contain API modules that allow for the functionality of one or both of these modules to be invoked directly by software external to the asset associator 120 or even asset correlation system 101.

In some embodiments, string creation module 136 may be used to generate a string representation of the computer network addressing information part of event information 102. In some embodiments, string creation module 136 may generate the string representation by accessing at least some (e.g., all) of the network parameter (or other) values in the computer network addressing information and concatenating these values into a single string (optionally, with one or more separator characters such as spaces, tabs, or commas between the parameter values). In some embodiments, string creation module 136 may generate multiple strings from the computer network addressing information. For example, the network parameter values (or any other data included in the computer addressing information) may be used to generate multiple strings and the string representation may include the multiple strings. Each such string may include numeric, alphabetic, numeric and alphabetic characters, and/or symbols (e.g., punctuation, special symbols, etc.).

In some embodiments, numeric embedding module 132 may be used to generate the numeric representation of the computer network addressing information part of event information 102. For example, the numeric embedding module 132 may include software that implements one or more character embedding techniques described herein and/or for accessing one or more implementations of any such character embedding technique in a software library. As another example, numeric embedding module 132 may include software to perform a one-hot-encoding of a string representation of the computer network addressing information part of event information 102. Numeric embedding module may include software for performing any other suitable numeric embedding technique, as aspects of the technology described herein are not limited in this respect.

In some embodiments, the numeric embedding module 132 may generate an initial numeric representation of the computer network addressing information and, subsequently, generate a lower-dimensional numeric representation from the initial numeric representation. This may be done using any suitable dimensionality reduction technique (e.g., principal components analysis (PCA), factor analysis (FA), linear discriminant analysis (LDA), truncated singular value decomposition, kernel PCA, t-distributed stochastic neighbor embedding (t-SNE), multi-dimensional scaling, isometric mapping, manifold learning, etc.).

In some embodiments, the dimensionality reduction may be performed using at least one trained machine learning model (e.g., an autoencoder). In this case, the initial numeric representations provided as input to the at least one trained machine learning model to obtain a lower-dimensional numeric representation. In some embodiments, machine learning (ML) module 134 may include software for executing trained machine learning models (e.g., autoencoders). For example, the ML module may provide the initial numeric representation as input to one or more autoencoders and calculate the latent representation (which is lower dimensional) from the input using the layers and parameters of the autoencoder(s) (e.g., encoder portion(s) of the autonencoder(s)). Aspects of this are described further herein including with reference to FIGS. 6A-6E.

In some embodiments, at least one trained machine learning model used for determining a numeric asset signature (e.g., as part of ML module 134) may be trained using software part of training module 138. For instance, the training module 138 may be used to train the autoencoder of the machine learning (ML) module 134, as described herein including with reference to FIGS. 6D-6E. To this end, the training module 138 may access training data (stored e.g., in data storage layer 150) and use the accessed training data to estimate parameters of the at least one machine learning model being trained. The estimation may be done using any suitable training technique with respect to any suitable reconstruction loss, as aspects of the technology described herein are not limited in this respect.

As described herein, the LSH module comprises software for processing asset signatures (e.g., any of the signatures generated by signature generation module 130, whether string signatures or numeric signatures) and computes corresponding hashed signatures using a locality sensitive hashing technique. As shown in FIG. 1C, LSH module 140 comprises four sub-modules: shingler module 142, hashing module 144, minhash module 146, and hyperplane module 148.

In some embodiments, the LSH module 140 may compute a hashed signature using a minimum-hash (or minhash) technique, which is a type of locality sensitive hashing technique. Computing a hashed signature, from an asset signature, using the minhash technique may involve: (1) shingling, using shingler module 142, the asset signature to obtain a plurality of shingles; (2) hashing, using the hashing module 144, the plurality of shingles using one or more hashing functions to obtain a plurality of hashes; and with the minhash module 146 performing (3) permuting (e.g., sorting) the plurality of hashes; (4) selecting a first threshold number of hashes in the permuted plurality of hashes (e.g., selecting the first ten hashes in the sorted list of hashes); and (5) generating the hashed signature (corresponding to the asset signature) from the selected hashes (e.g., by creating a vector with each element value being the value of a hash).

In some embodiments, the shingler module 142 may generate shingles from an asset signature obtained from signature generation module 130. The asset signature may be a string or multiple strings or may be numeric. The shingler module 142 may generate any suitable number of shingles of any suitable length. Aspects of how the shingling is performed are described herein including with reference to FIGS. 4A and 4B.

In some embodiments, the hashing module 144 may hash each of at least some (e.g., all) of the shingles generated by the shingler module 142. To this end, the hashing module 144 may use one or more hashing functions. Non-limiting examples of hash functions that could be used in this respect are a message digest hashing function (e.g., MD2, MD3, MD4, MD5, MD6), a secure hash function (e.g., SHA-0, SHA-1, SHA-2, SHA-224, SHA-256, SHA-384, SHA-512, SHA3), the NTLM hashing function, and the LANMAN hashing function. In some embodiments, all the shingles generated from one asset signature may be hashed using the same hashing function. In other embodiments, different shingles (generated from the same asset signature) may be hashed using different hashing functions. In some embodiments, a hashing function producing a desired number of bits may be selected or, if the hashing function produces more than the desired number of bits, a desired subset of the bits may be used.

In some embodiments, the minhash module 146 permutes the hashes generated by hashing module 144. The min-hashing module may permute the hashes in any suitable way. For example, the min-hashing module may permute the hashes by sorting them. As another example, the min-hashing module may generate a random permutation (e.g., using pseudo-random number generator (PRNG)) and permute the hashes in accordance with the random permutation.

After permuting the hashes, which puts those hashes into a new order, the minhash module 146 may take the first K hashes (where K is a threshold number, like 5, 10, or 20) according to the new order, and combines them (e.g., by concatenation, create a K-dimensional vector with the coefficient of each dimension being a corresponding hash) to form a hashed signature. Aspects of the min-hash technique are described further herein including with reference to FIGS. 2B and 4A-4C.

In some embodiments, the LSH module 140 may compute a hashed signature using a randomized hyperplanes technique, which is another type of locality sensitive hashing technique. This technique may be applied to numeric asset signatures. The hyperplane module 148 may be used to implement the randomized hyperplanes technique, in some embodiments.

To this end, in some embodiments, the hyperplane module 148 may: (1) receive a numeric representation of an asset from signature generation module 130 (e.g., a numeric signature generated using module 132 and, optionally module 134); and (2) encode the numeric representation using a plurality of randomized hyperplanes (e.g., 2, 4, 8, 16, 32, 64 hyperplanes, with the number being selected on the desired dimensionality of the encoding) to generate the hashed representation (which is the encoding). In some embodiments, the hyperplane module 148 may perform the encoding by generating a binary encoding of the numeric representation, the binary encoding specifying, for each particular hyperplane of the plurality of randomized hyperplanes, a side of the particular hyperplane on which the numeric representation falls.

In some embodiments, the number and coefficients (e.g., of the normal vectors) defining the hyperplanes may be selected prior to using the module 148 to compute hashed signatures of assets. These data may be stored (e.g., in data storage layer 150) and accessed by module 148 when executing. Aspects of the randomized hyperplane technique are described herein including with reference to FIGS. 2C and 3A-3E.

In some embodiments, asset association module 160 associates assets implicated by events on the computer network with one or more assets in the asset catalog 162. To this end, in some embodiments, the asset association module 160 may compare hashed signatures of assets implicated by network events with hashed signatures of assets in the asset catalog.

Additionally or alternatively, however, in some situations, the asset association module 160 may compare the (non-hashed) asset signatures of the implicated assets to the (non-hashed) asset signatures of the assets in the asset catalog. This may be useful in various circumstances. For example, when a comparison based on hashed signatures returns identifies more than one asset from the asset catalog (e.g., because, even if assets have unique asset signatures, they may not have unique hashed signatures, or because the matching is done to within a tolerance rather than requiring exact matches), a further comparison based on the non-hashed signatures may be used to identify a single asset from the asset catalog with which to associate an asset implicated by an event on the computer network. Such two-stage processing may be advantageous because: (1) using non-hashed signatures for comparison is too computationally intensive given their length and the number of assets in the asset catalog; and (2) the two-stage process significantly reduces the number of assets that need to be considered at the second stage so that using non-hashed signatures at the second stage is practical. For instance, a comparison based on hashed signatures (e.g., generated by LSH module 140) may be used to reduce the group of candidates from millions of assets to thousands or hundreds of assets, and a comparison based on non-hashed signatures (e.g., generated by signature generation module 130) is then used to identify the best match from the group of thousands or hundreds of assets (which is more practical given the limited time that the asset associator has to perform said associations).

In addition, in some embodiments, the assets in the asset catalog 162 may be sharded into groups based on their hashed signatures. In this way, a comparison between a hashed signature of a particular asset implicated by an event and the hashed signatures of assets in the asset catalog may be performed in parallel—different nodes (e.g., processors) may be used to compare the hashed signature of the particular asset to different groups of assets in the catalog; the groups being assigned in advance to different nodes based on the range of hashed signature values in which they fall.

In some embodiments, two signatures may be compared in any suitable way and using any suitable measure of similarity. For example, as described herein, Hamming distance or a Jaccard index may be used as measures of similarity. Though any other suitable measures of similarity may be used herein (e.g., Euclidean distance, Lp norm, etc.), as aspects of the technology described herein are not limited in this respect.

Also, as shown in FIG. 1C, asset correlation system 101 comprises a data storage layer 150, which may store any data used by asset associator 120. The data storage layer 150 may store these data using any suitable data storage technology including, but not limited to, one or more database systems (of any suitable type), flat files, a distributed storage solution, cloud-based storage, or in any other suitable way, as aspects of the technology described herein are not limited in this respect.

In the example of FIG. 1C, data storage layer stores a listing of assets on a computer network in asset catalog 162. In connection with each asset, the asset catalog 162 may store any suitable information including, but not limited to, computer network addressing information for the asset. In addition, previously-computed signatures and hashed signatures for the assets in catalog 162 may be stored in data stores 152 and 154, respectively. Having these signatures be pre-computed speeds up the comparisons being performed by the association module 160. The data stores 152 and 154, and asset catalog 162 may store the data in any suitable way, in any suitable format, and using any suitable storage technology, as aspects of the technology described herein are not limited in this respect. In some embodiments, asset catalog 162 may include the signatures and hashed signatures of its assets.

Figure 2A:
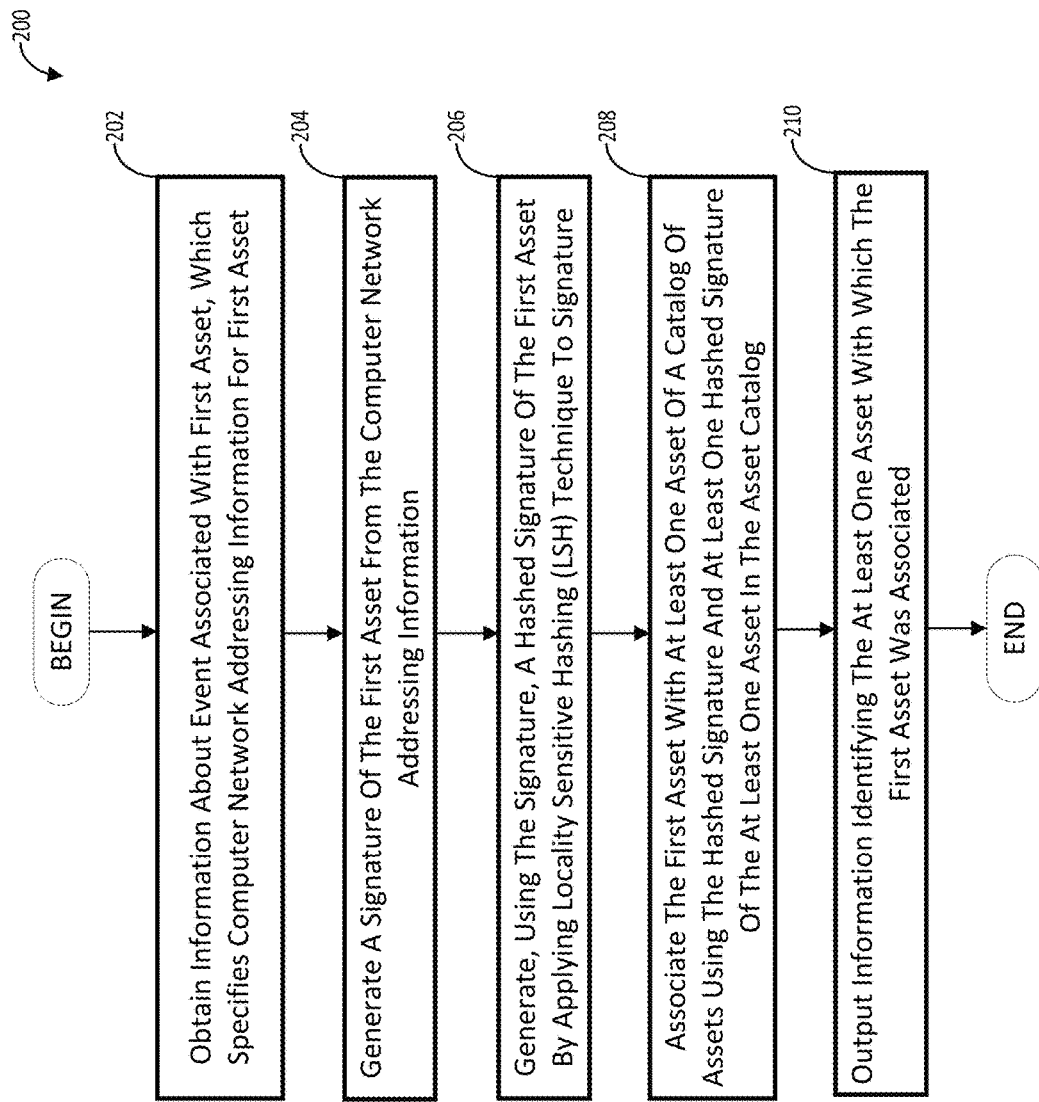
FIG. 2A is a flowchart of an illustrative process 200 for associating assets related to events with assets in an asset catalog of a computer network by using locality sensitive hashing, in accordance with some embodiments of the technology described herein.

FIG. 2A is a flowchart of an illustrative process 200 for associating assets related to events with assets in an asset catalog of a computer network by using locality sensitive hashing, in accordance with some embodiments of the technology described herein. Process 200 may be performed using any suitable combination of software and hardware and may be performed using any suitable computing device(s). For example, process 200 may be performed by the example asset correlation system 101 described with reference to FIGS. 1A-1C.

Process 200 begins at act 202, where information about an event related to a first asset is obtained. In some embodiments, the information specifies computer network addressing information for the first asset. For example, the information may specify a hostname of the first asset, an IP address of the first asset, a MAC address of the first asset, and/or any other suitable type of computer network addressing information, examples of which are provided herein. The information may be in any suitable format.

The information about the event related to the first asset may be obtained in any suitable way and from any suitable source. For example, the information may be received from a network monitoring system (e.g., any one of network monitoring systems 170) via an API call, via event interface 111 or in any other suitable way. As another example, the asset correlation system 101 may itself be monitoring the computer network and may generate the information about the event in response to detecting occurrence of the event on the network.

Next, process 200 proceeds to act 204, where a signature of the first asset is generated from the computer network addressing information. As described herein, including with reference to FIGS. 1B-1C, the signature may be a string or numeric representation of at least some of the computer network addressing information. The signature may be generated by the signature generation module 130 of the asset correlation system 101.

Process 200 then proceeds to act 206 where a hashed signature of the first asset is generated, using the signature generated at act 204, by applying a locality sensitive hashing (LSH) technique to the generated signature. In some embodiments, applying the LSH technique involves applying the minhash technique. This is described herein including with reference to FIG. 2B. In some embodiments, applying the LSH technique involves applying the randomized hyperplanes technique. This is described herein including with reference to FIG. 2C.

Next, process 200 proceeds to act 208 where the first asset is associated with at least one asset of a catalog of assets using the hashed signature generated at act 206 and at least one hashed signature of the at least one asset in the asset catalog. As described herein, associating of the first asset implicated by the event with assets of the catalog of assets may be performed by the association module 160, and exact or close matches (e.g., matches to within a threshold tolerance) may be selected, at act 208, as part of the assets with which the first asset is associated.

The associating may comprise using any suitable measure of similarity. For example, if the associating uses hashed signatures generated using min-hashing, a Jaccard index may be used as part of the associating. In another example, if the associating uses hashed signatures generated from randomized hyperplanes, a Hamming distance metric may be used as part of the associating. The two measures of similarity are described herein including with reference to FIGS. 5A-5B. However, any suitable measure of similarity may be used including, Euclidean distance, Lp norm, etc.

Next, process 200 proceeds to act 210, where information identifying the at least one asset with which the first asset was associated is outputted. The information may be provided to any suitable destination including to a network monitoring system, examples of which are provided herein. The type of information outputted, exemplary ways of outputting the information, and exemplary ways of using such information are described herein including with reference to FIG. 1B. In reference to the exemplary process illustrated in FIG. 1B, since the identified asset is a device hosting a web server, the outputted information may specify the web URL associated with this identified asset, "marc.example.com." The outputted information may be of any format suitable for interpretation by the asset correlation system 101, including any of the suitable formats previously described for event information.

Figure 2B:
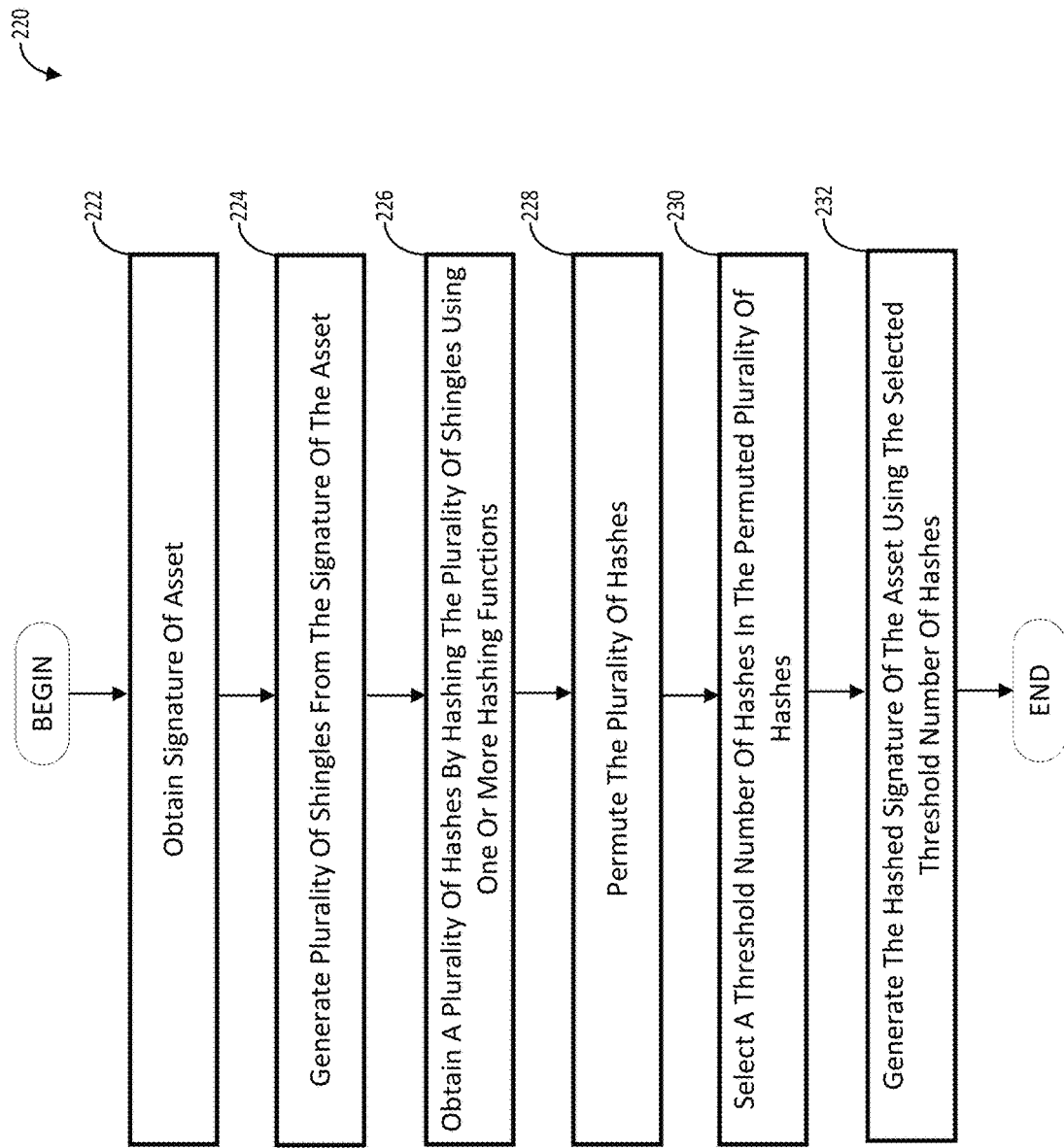
FIG. 2B is a flowchart of an illustrative process 220 for generating a hashed signature of an asset, in accordance with some embodiments of the technology described herein.

FIG. 2B is a flowchart of an illustrative process 220 for generating a hashed signature of an asset, in accordance with some embodiments of the technology described herein. The specific technique used in the process 220 to generate a hashed signature of an asset is the min-hashing technique. In some embodiments, the process may be performed by the minhash module 146 of the asset associator 120, as described herein including with reference to FIG. 1C. Process 220 may be used to implement act 206 of process 200.

Process 220 begins at act 222, where a signature of the asset may be obtained. This may be done in any suitable way including in any of the ways described with reference to act 204 of process 200. For example, the asset signature may be generated from at least some of the computer network addressing information. The asset signature may comprise a string or a numeric representation of the computer network addressing information.

Next, process 220 proceeds to act 224, where a plurality of shingles is generated from the signature of the asset. Any suitable number of shingles of any suitable length may be generated by the shingler module 142. Aspects of the shingling process are described herein including with reference to FIGS. 4A-4B.

Next, process 220 proceeds to act 226, where a plurality of hashes is obtained by hashing the plurality of shingles using one or more hashing functions. All the shingles may be hashed using the same hashing functions or different hashing functions may be used. Examples of hashing algorithms and ways to hash the plurality of shingles are described herein including with reference to FIG. 1C. The hashing may be performed in the hashing module 144.

Next, process 220 proceeds to act 228, where the plurality of hashes is permuted. The permuting may be done in any suitable way. For example, permuting the hashes may comprise sorting the plurality of hashes, for example, in ascending or descending numerical order. As another example, the permuting may comprise arranging the plurality of hashes in a random order by, e.g., by using a pseudo-random number generator (PRNG) to generate a random permutation and permuting the hashes in accordance with the random permutation. The minhash module 146 may perform the permuting of the plurality of hashes.

Next, process 220 proceeds to act 230, where a threshold number of hashes in the permuted plurality of hashes is selected. The threshold number may be any suitable threshold number. For example, the threshold number may be one of 2, 3, 4, 5, 6, 7, 8, 9, or 10 hashes, or any suitable number of hashes between 2 and 50 hashes. The threshold number may be selected based on a number of factors, including the size of the computer network, the number of hashes obtained in the plurality of hashes, past performance of min-hash based on various threshold numbers, space and resource constraints of the software/hardware components of the asset correlation system 101, and input from an operator of the asset correlation system 101.

Next, process 220 proceeds to act 232, where the hashed signature of the asset is generated using the selected threshold number of hashes. In some embodiments, the hashed signature comprises the threshold number of the permuted hashes from act 230 combined into a hashed signature. The hashed signature may be in any suitable format, such as a list or vector format. For instance, the threshold number of permuted hashes may be concatenated to create a K-dimensional vector, with the coefficient of each dimension being a corresponding hash. Alternatively, the threshold number of permuted hashes may be concatenated. This generated hashed signature may be returned to the association module 160 of the associating act 208 of FIG. 2A.

Figure 2C:
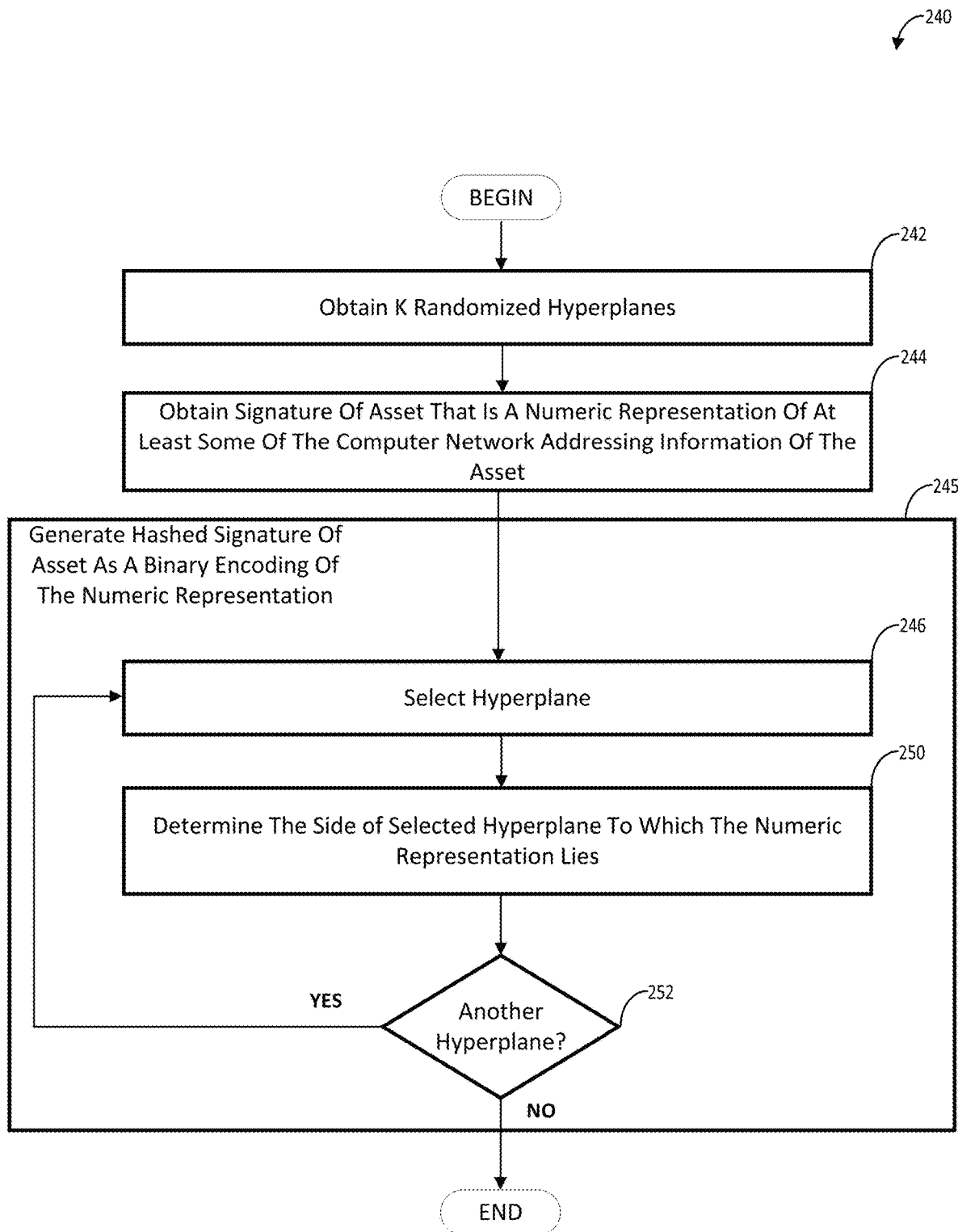
FIG. 2C is a flowchart of an illustrative process 240 for generating a hashed signature of an asset using randomized hyperplanes, in accordance with some embodiments of the technology described herein.

FIG. 2C is a flowchart of an illustrative process 240 for generating a hashed signature of an asset using randomized hyperplanes, in accordance with some embodiments of the technology described herein. The process may be performed by the hyperplane module 148 of the asset associator 120 as described herein including with reference to FIG. 1C. Process 240 may be used to implement act 206 of process 200, as an alternative to process 220.

Process 240 begins at act 242, where K randomized hyperplanes are obtained. The value of K may be any suitable value, and represents the desired dimensionality encoding obtained by using the randomized hyperplanes technique. For example, the value of K may be any number between 1 and 1024 inclusive. For another example, the value of K may be a power of two, for example: 2, 4, 8, 16, 32, 64, 128, 256, 512, and 1024.

Process 240 then proceeds to act 244, where the signature of the asset generated from act 204 of process 200 is obtained. This may be done in any suitable way including in any of the ways described with reference to act 204 of process 200. For example, the asset signature may be generated from at least some of the computer network addressing information. The asset signature may comprise a numeric representation of the computer network addressing information.

Next process 240 proceeds to act 245, where a hashed signature of the asset is generated as a binary encoding of the numeric signature obtained at act 244. The binary encoding is a K-dimensional binary vector and each element of the vector indicates the side of the corresponding hyperplane to which the numeric signature falls.

Act 245 may be performed in any suitable way. For example, each of the K elements may be determined by repeating the series of acts 246-252. For instance, at act 246, one of the K hyperplanes obtained in act 242 is selected. The hyperplanes may be selected in any suitable order (so long as the order is the same as the order of hyperplanes used to determine hashes for assets in the asset catalog), as aspects of the technology described herein are not limited in this respect.

Next, at act 250, a determination is made as to which side of the selected hyperplane to which the numeric signature falls. This determination may be made in any suitable way including in any of the ways described herein including with reference to FIGS. 3B-3E. Based on this determination, act 250 may further involve generating a binary encoding representing this determination of which side the hyperplane lies. For instance, a simple encoding of "1" for the positive side and "0" (or "−1") for the negative side may be created for the binary encoding. Though any other pair of values may be used. Next, at act 252 it is determined whether K hyperplanes have been processed. If so, then process 240 returns to act 246 and acts 246-252 are repeated for the other hyperplane. Otherwise, the process 240 ends and the generated hashed signature may be output and subsequently used in accordance with embodiments described herein (e.g., at act 208 described with reference to FIG. 2A). Act 245 may be implemented serially (as shown in FIG. 2C) or in parallel.

Figure 3A:
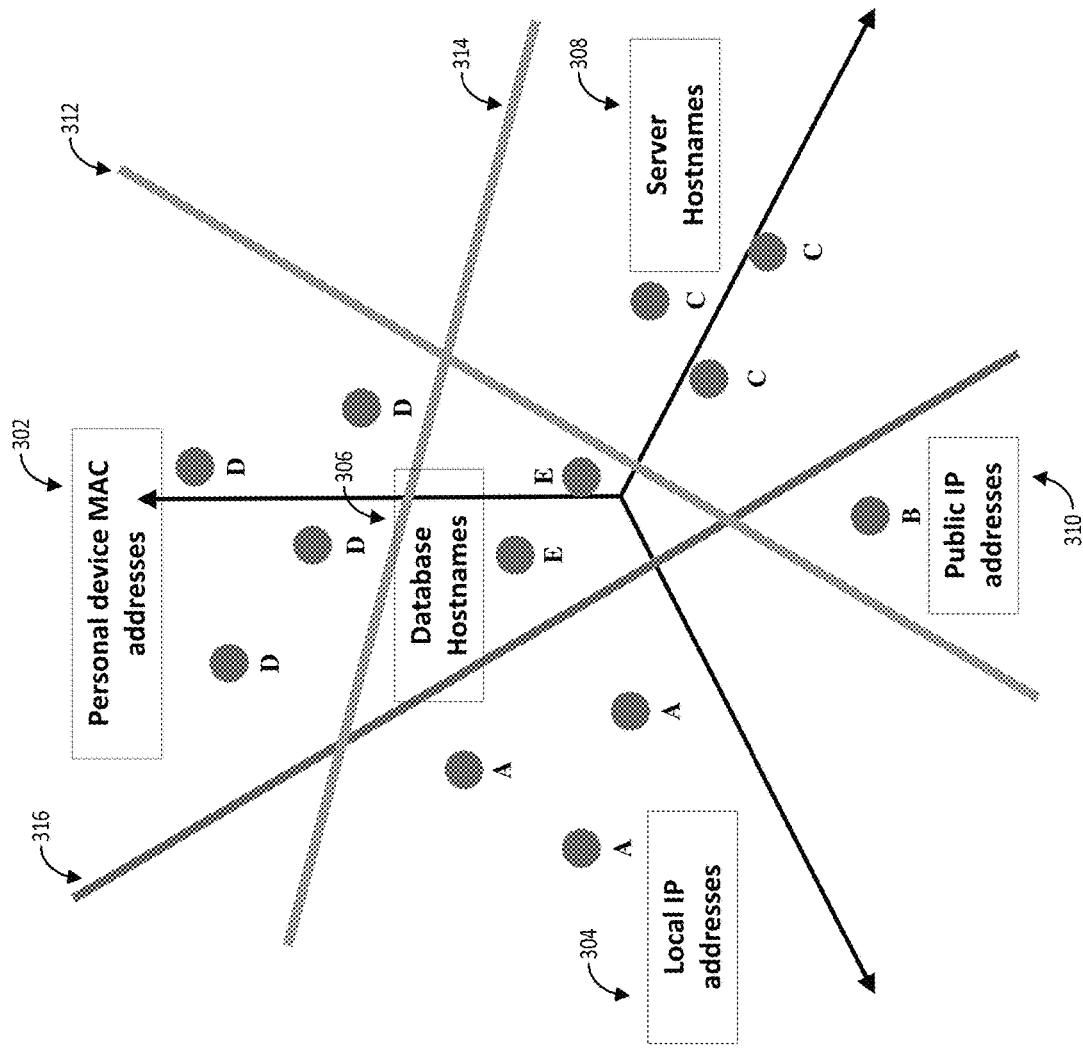
FIG. 3A is an example of how randomized hyperplanes may be used to categorize computer network addressing information, in accordance with some embodiments of the technology described herein.

FIG. 3A is an example of how randomized hyperplanes may be used to categorize computer network addressing information, in accordance with some embodiments of the technology described herein. Three hyperplanes 312, 314, and 316, create at least five distinct regions. The regions include: personal device MAC addresses 302, local IP addresses 304, database names 306, server hostnames 308, and public IP addresses 310. As evident from FIG. 3A, these regions are distinguishable by which sides of the hyperplanes they lie. As a result, for each numeric representation, the region in which they fall may be determined mathematically, as described herein including with reference to FIGS. 3B-3E. For instance, each of the numeric representations in Region D may be determined to fall within that region by calculating the dot product between every hyperplane normal vector and the vector of the numeric representation. This results in a binary encoding such that, if every numeric representation in Region D were to calculate its own binary encoding the same way, then all of their binary encodings will be identical, and furthermore distinct from all binary encodings of numeric representations not lying within Region D.

Figure 3B:
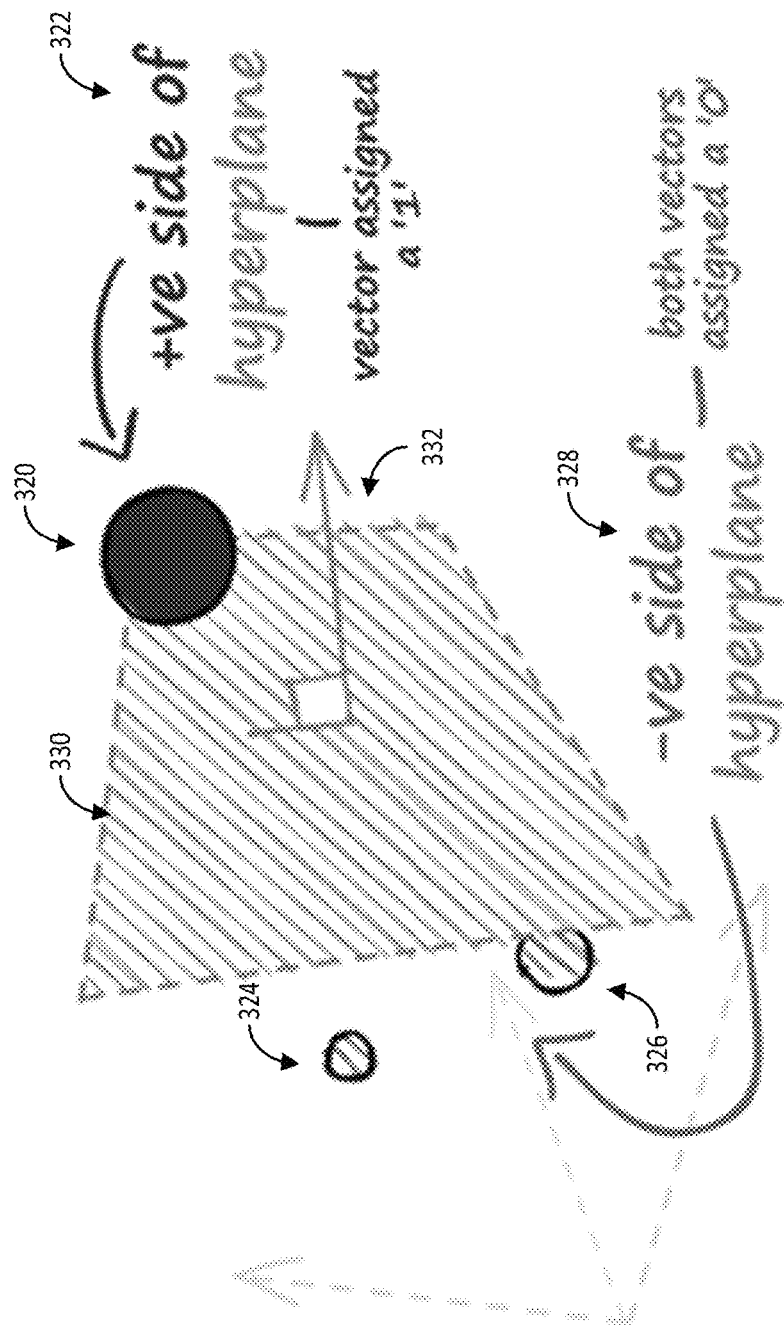
FIGS. 3B-3E illustrate aspects of determining a binary encoding of a numeric asset signature as part of determining a hashed version of the numeric asset signature using randomized hyperplanes, in accordance with some embodiments of the technology described herein.

FIGS. 3B-3E illustrate aspects of determining a binary encoding of a numeric asset signature as part of determining a hashed version of the numeric asset signature using randomized hyperplanes, in accordance with some embodiments of the technology described herein. As illustrated in FIG. 3B, several numeric representations, illustrated as datapoints 320, 324, and 326, are mapped onto a three-dimensional space with one hyperplane 330. The side of the hyperplane in which the numeric representations fall may be determined by the relative positions of the numeric representations 320, 324, and 326 to the normal vector of the hyperplane 332. In this illustration, numeric representation 320 is located on the positive side of the hyperplane (i.e., alongside the positive direction of the normal vector 332), whereas numeric representations 324 and 326 are located on the negative side of the hyperplane (i.e., alongside the negative direction of the normal vector 332).

Figure 3C:
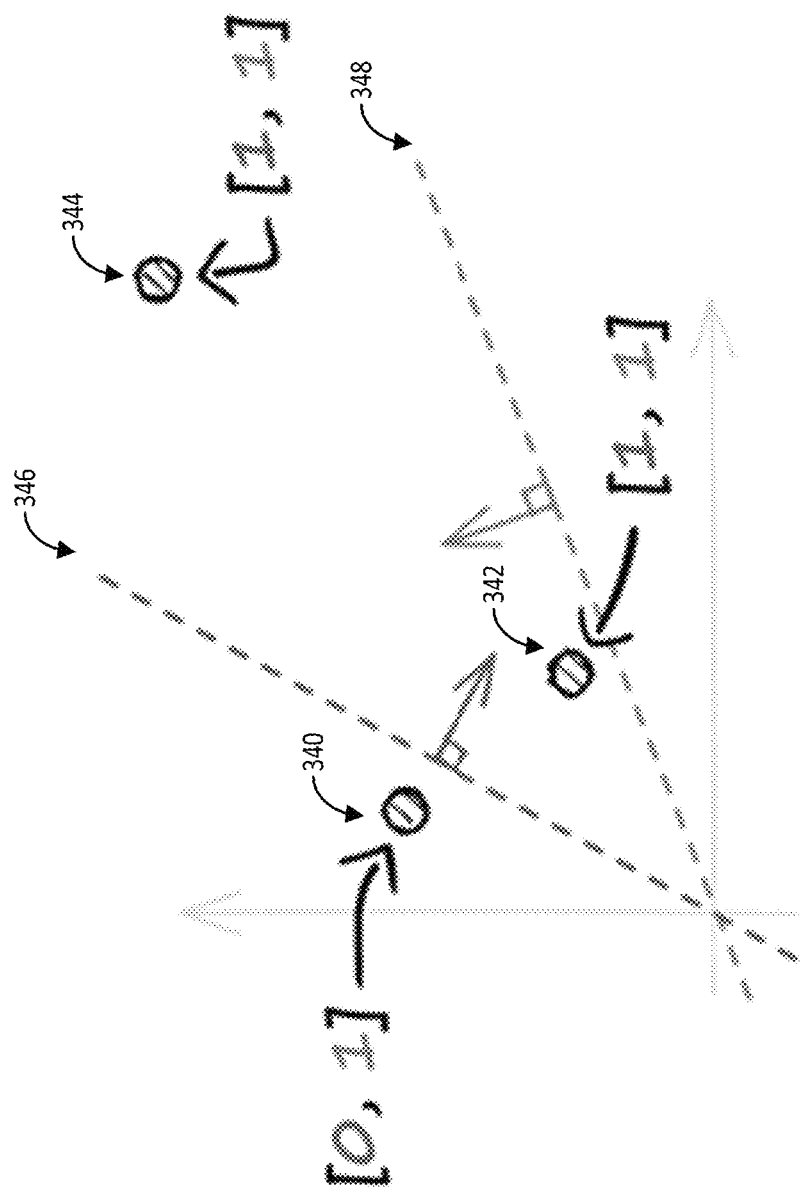
Figure 3D:
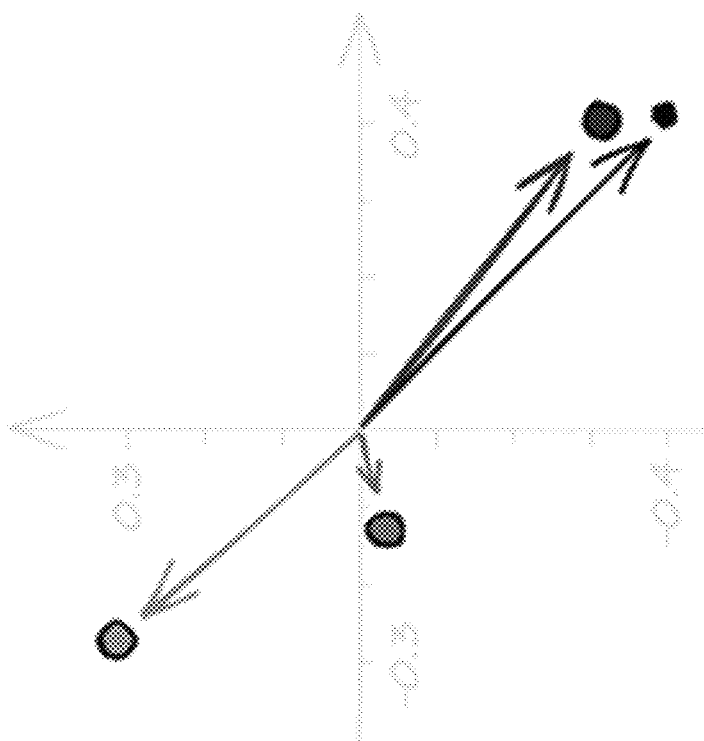

FIGS. 3C and 3D similarly illustrate how numeric representations may be positioned relative to hyperplanes of different dimensions. In FIG. 3C specifically, two-dimensional numeric representations of numeric representations 340, 342, and 344 of computer network addressing information lie on positive and/or negative sides of hyperplanes 346 and 348. For instance, numeric representation 340 lies on the negative side of hyperplane 346 but on the positive side of hyperplane 348, whereas numeric representations 342 and 344 both lie on the positive sides of both hyperplanes 346 and 348.

Figure 3E:
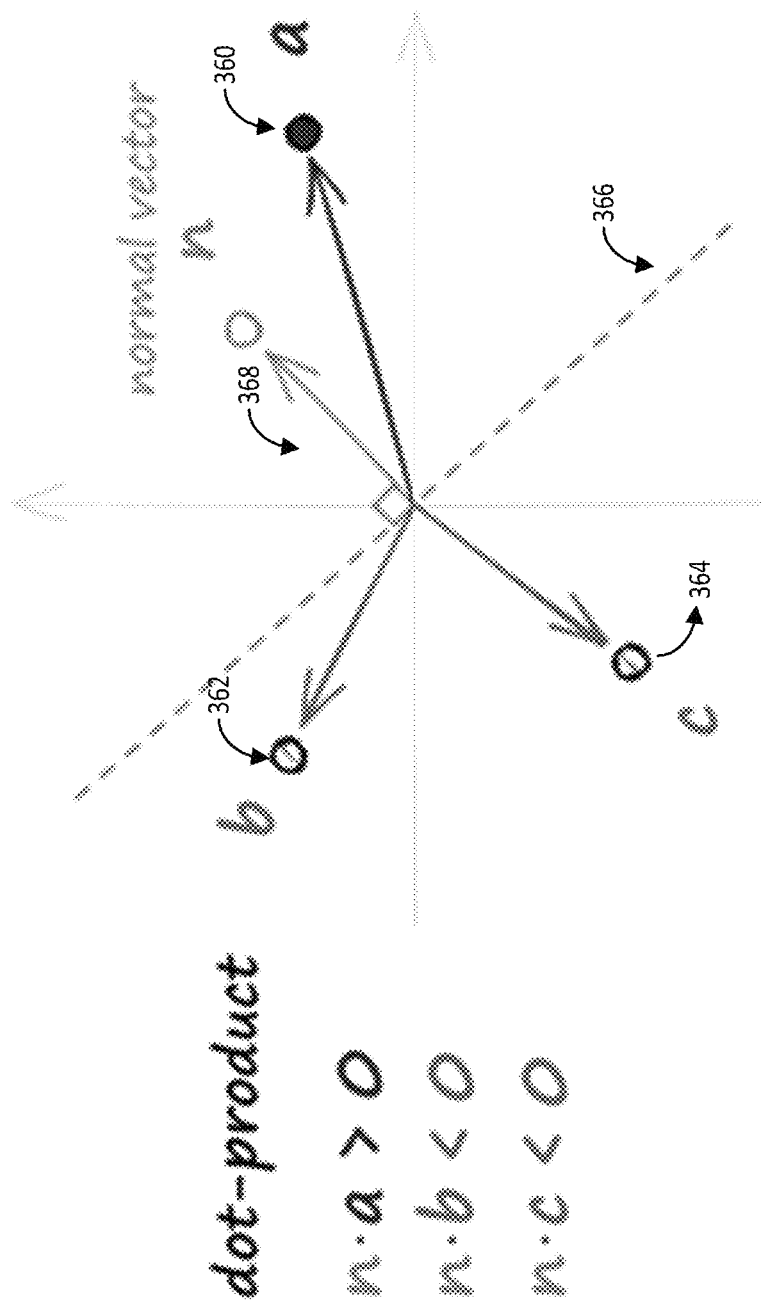

FIG. 3E illustrates the relationship between the dot product of the numeric representations and hyperplane vectors, and the position of the numeric representations relative to the hyperplanes. In this example, numeric representations 360, 362, and 364 are shown relative to hyperplane 366. As described previously, the relative positions of the numeric representations may be determined by the normal vector of the hyperplane 368. One may also create vectors a, b, and c that are representative of numeric representations 360, 362, and 364, respectively. The dot product between these vectors and the normal vector 368 of the hyperplane may then be calculated. If the dot product is positive (as is the case for the dot product between vector a of 360 and the normal vector of the hyperplane), the corresponding numeric representation lies on the positive side of the hyperplane. Likewise, if the dot product is negative (as is the case for both dot products between vector b of 362 and the normal vector of the hyperplane, and vector c of 364 and the normal vector of the hyperplane), the corresponding numeric representation lies on the negative side of the hyperplane. The hyperplane module 148 may use this principle to determine which side of the hyperplane the numeric representation falls during act 250 of process 240. Furthermore, the hyperplane module 148 may use the dot product itself to determine the binary encoding described in act 250.

Figure 2D:
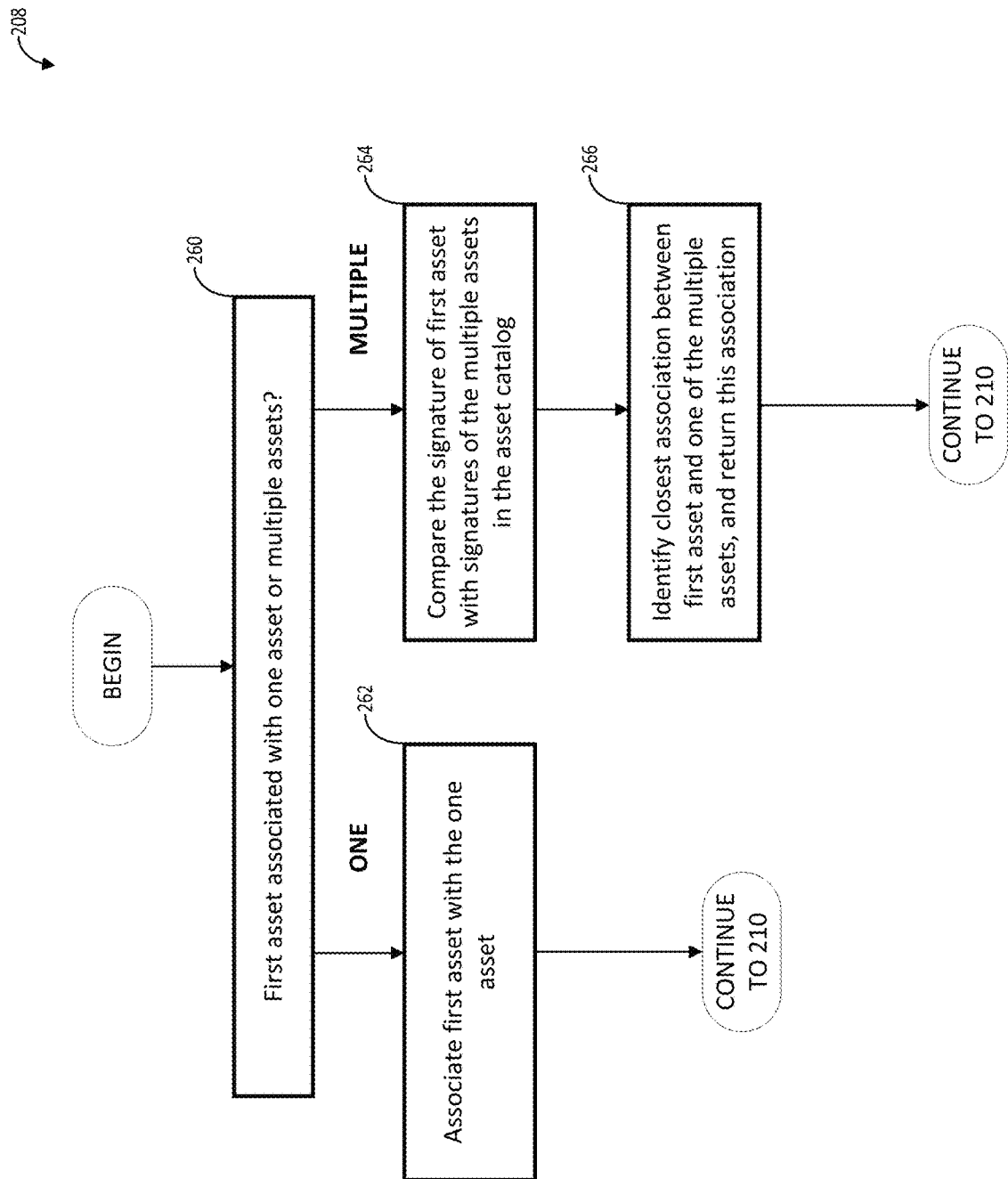
FIG. 2D is a flowchart of an illustrative process for implementing act 208 of process 200 illustrated in FIG. 2A, in accordance with some embodiments of the technology described herein.

FIG. 2D is a flowchart of an illustrative process for implementing act 208 of process 200 illustrated in FIG. 2A, in accordance with some embodiments of the technology described herein. The process may be performed by the association module 160 as described previously in relation to FIG. 1C, but may also be performed by various submodules within the signature generation module 130, as described further below.

In act 260, the process determines whether the first asset is associated with only one asset in the catalog of assets or is associated with multiple assets of the catalog. As described herein including with relation to FIG. 1C, the association module 160 in act 208 determines associations between the first asset implicated by the event and assets in the asset catalog of the computer network, using any suitable measure of similarity (e.g., Hamming distance metric and Jaccard index, described further herein including with relation to FIGS. 5A-5B). However, in some associations, the first asset implicated by the event may be associated with multiple assets of the asset catalog for various reasons. For instance, multiple associations may result due to identical hashed signatures of the assets despite unique asset signatures. For instance, hashed signatures of several assets generated by randomized hyperplanes may result in identical Hamming distances despite the asset signatures of the several assets being different, due to the configuration of the randomized hyperplanes. Alternatively, the first asset may be associated with multiple assets if the associating between the hashed signatures is done within a tolerance. For instance, a hashed signature may be associated with another hashed signature if the measure of similarity between the signatures is within a certain threshold value (e.g., difference between the signatures is less than 5%—or any percent—relative to the difference between other hashed signatures of the assets of the asset catalog). Alternatively, multiple measures of similarity may have been applied to the association, and, for each measure of similarity, the asset closest in association with the first asset may constitute a group of multiple assets associated with the first asset implicated by the event.

If the first asset is associated with only one asset, process 200 proceeds to act 262 and the association is complete, returning the single association to act 210 of process 200. On the other hand, if the first asset is associated with multiple assets, process 200 proceeds to act 264, where the signature of the first asset and the (unhashed) signatures of the multiple assets are compared. Any suitable method of comparison may be used during the comparison of the signatures. For instance, the process may use any suitable string comparisons if the signatures are string representations of the computer network addressing information. If the signatures are numeric representations, the process may use any suitable measure of similarity for comparison, including the Hamming distance metric described herein including with reference to FIG. 1C (and further described herein including with reference to FIG. 5B).

In act 266, based on the comparison of the first asset's signature with the multiple assets' signature, the association module 160 identifies the closest association between the first asset and one of the multiple assets, and this association is then returned to act 210 of the process. It should be recognized that such comparison may yield more than one association. In such scenario, the process may either return to act 264 and apply a different measure of similarity to obtain a single association, or return the multiple associations to act 210 of the process.

Figure 4A:
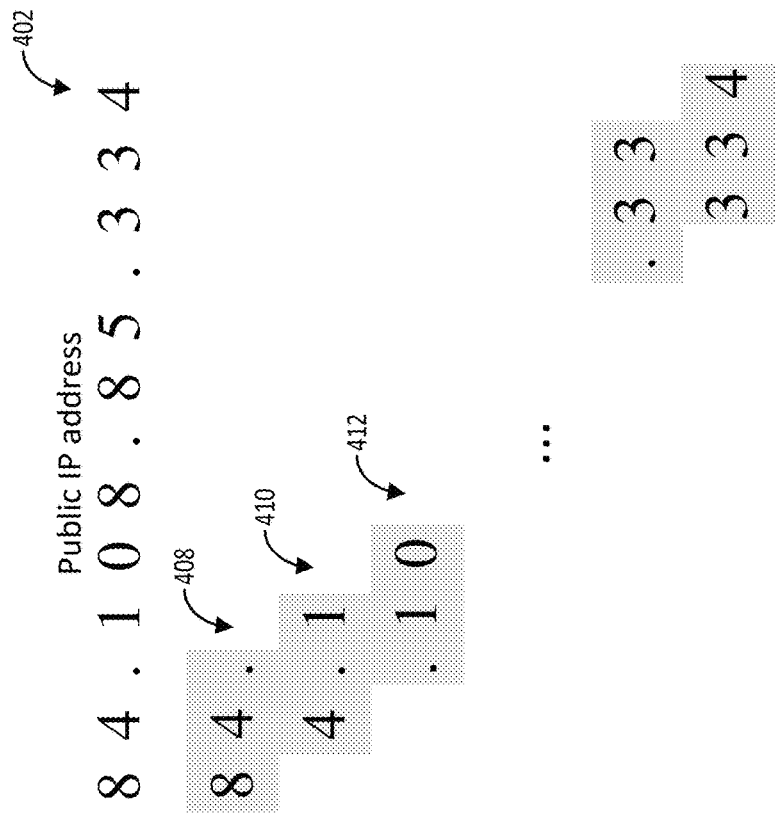
FIGS. 4A-4B illustrate examples of generating a plurality of shingles from an asset signature, in accordance with some embodiments of the technology described herein.
Figure 4B:
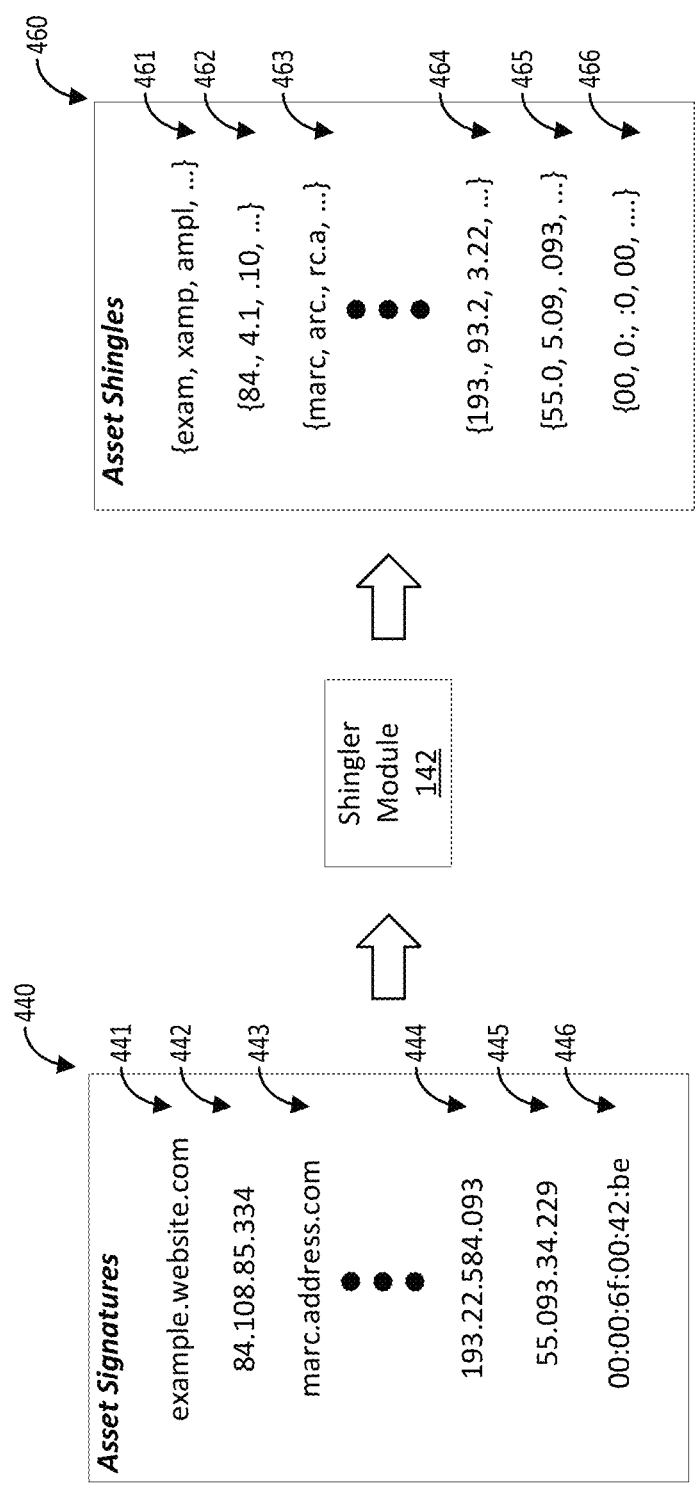

FIGS. 4A-4B illustrate examples of generating shingles from an asset signature, in accordance with some embodiments of the technology described herein. As described previously, string or numeric representations of assets may be shingled during the generation of their respective minhashed signatures.

As illustrated in FIG. 4A, a public IP address 402 may be a signature for a particular network asset. In this illustration, the asset signature comprises a string representation "84.108.85.334" of a computer network addressing information. Upon retrieving this asset signature, the shingling process generates a group of M shingles each of size N (e.g., N=3 in this example) from the signature by sliding a window of size N through M different positions. The size of the shingles and the length of the stride may be set to any suitable number. For example, the value of N may be any number between 1 and 64 inclusive. For another example, the value of N may be a power of two, for example: 2, 4, 8, 16, 32, and 64. The length of the stride, for example, may be any number between 1 and 10 inclusive. In the example of FIG. 4A, the length of the stride is 1, thus resulting in the generation of N−2 shingles including shingles 408, 410, and 412.

The parameters N and M (or, equivalently, M and length of stride) may be selected in any suitable way. For example, N may be chosen such that the shingles best represent subgroups of data within the signatures. For instance, in IP addresses, the sub-identifications (e.g., network ID and host ID) are delineated by periods and have predictable lengths. As a result, shingling IP addresses with values of N from 2 to 4 may produce shingles that accurately depict these sub-identifications of IP addresses. In some embodiments, the value of N or M may be chosen based on empirical data. For instance, the shingler module 142 may calculate the average length of signatures that are subject to shingling and narrow the range of shingle sizes based on this average. The shingler module may also determine an optimal shingle size based on historical performance of asset association versus corresponding shingle sizes. An administrator of the asset correlation system may set the shingle size.

FIG. 4B illustrates additional examples of shingles generated from asset signatures. For instance, among the asset signatures 440, a uniform resource locator (URL), such as "example.website.com" 441 and "marc.address.com" 443, is a common string representation of a network asset and therefore may be subject to the shingling process. A shingle size of N=4 may be appropriate for URLs. Within the asset shingles 460, the shingles 461 and 463 corresponding to the asset signatures 441 and 443 respectively are generated by the shingler module 142 with shingle size of N=4. For IP addresses 442, 444, and 445, a shingle size of N=3 or 4 may be appropriate for generating corresponding shingles 462, 464, and 465. On the other hand, since MAC addresses are typically grouped by octets, a shingle size of N=2 may be appropriate (e.g., MAC address 446 corresponding to shingle 466 with shingle size of N=2), although a larger shingle size may be chosen to encapsulate other identifying information such as OUI or NIC specific bits.

Figure 5A:
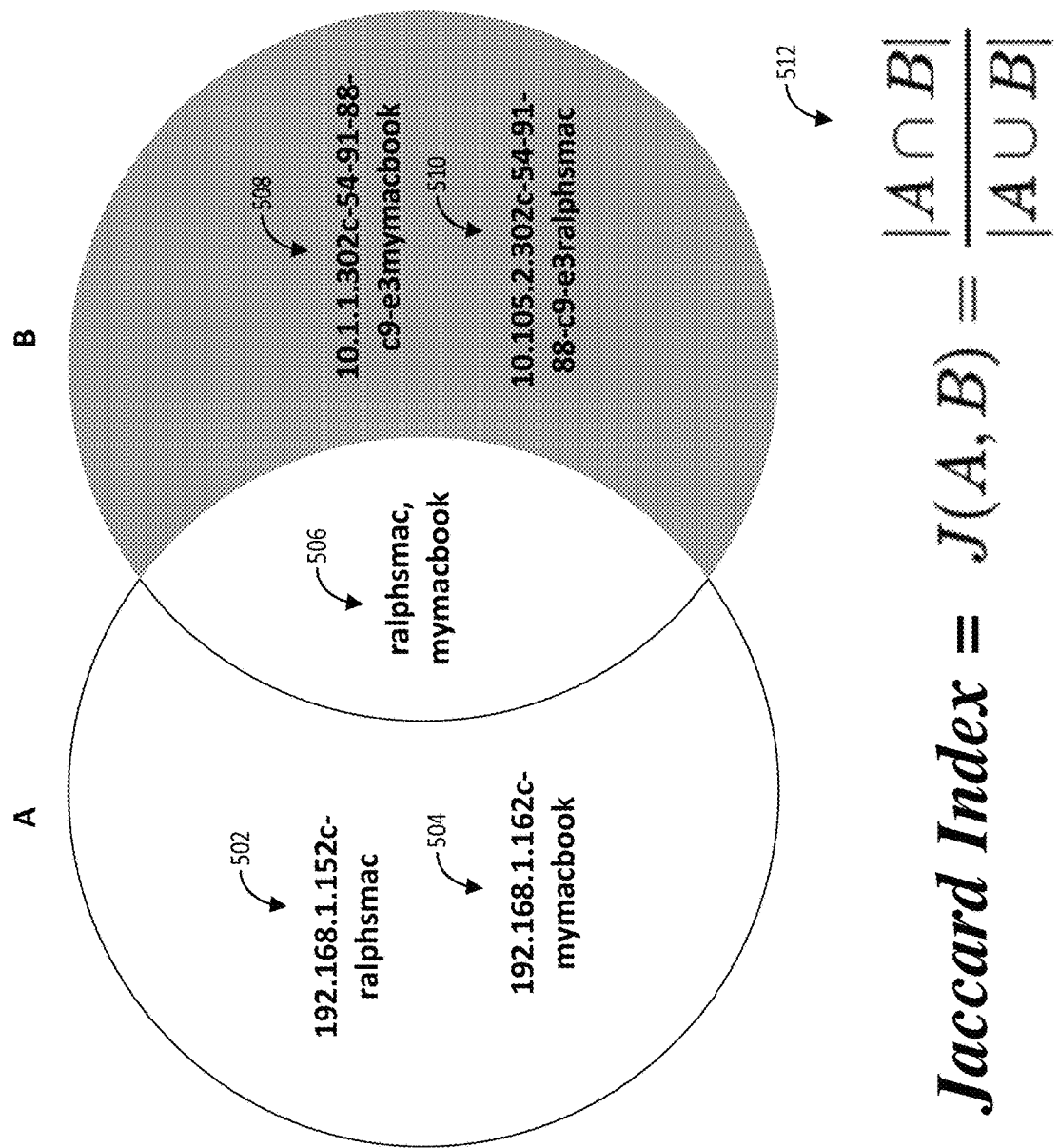
FIG. 5A illustrates aspects of calculating a Jaccard index, in accordance with some embodiments of the technology described herein.

FIG. 5A illustrates aspects of calculating a Jaccard index, in accordance with some embodiments of the technology described herein. The Jaccard index measures similarity between sets of data. Mathematically, the index calculates the ratio of the intersection of two sets and the union of two sets. The Jaccard index may be used to calculate the similarity between the locality sensitive hashed signatures of string representations of computer network addressing information, as described previously in relation to the LSH embodiments. In FIG. 5A, set A comprises private Class C IP addresses 502 and 504 annotated with identifiers of the associated network assets, "ralphsmac" and "mymacbook." Set B comprises private Class A IP addresses 508 and 510 similarly annotated with identifiers "ralphsmac" and "mymacbook." Once the individual IP addresses are hashed using locality sensitive hashing (e.g., min-hashed using the shingling process described previously), the Jaccard index 512 may quantify the similarity (i.e., the commonality of "ralphsmac" and "mymacbook" 506) between the two sets.

Figure 5B:
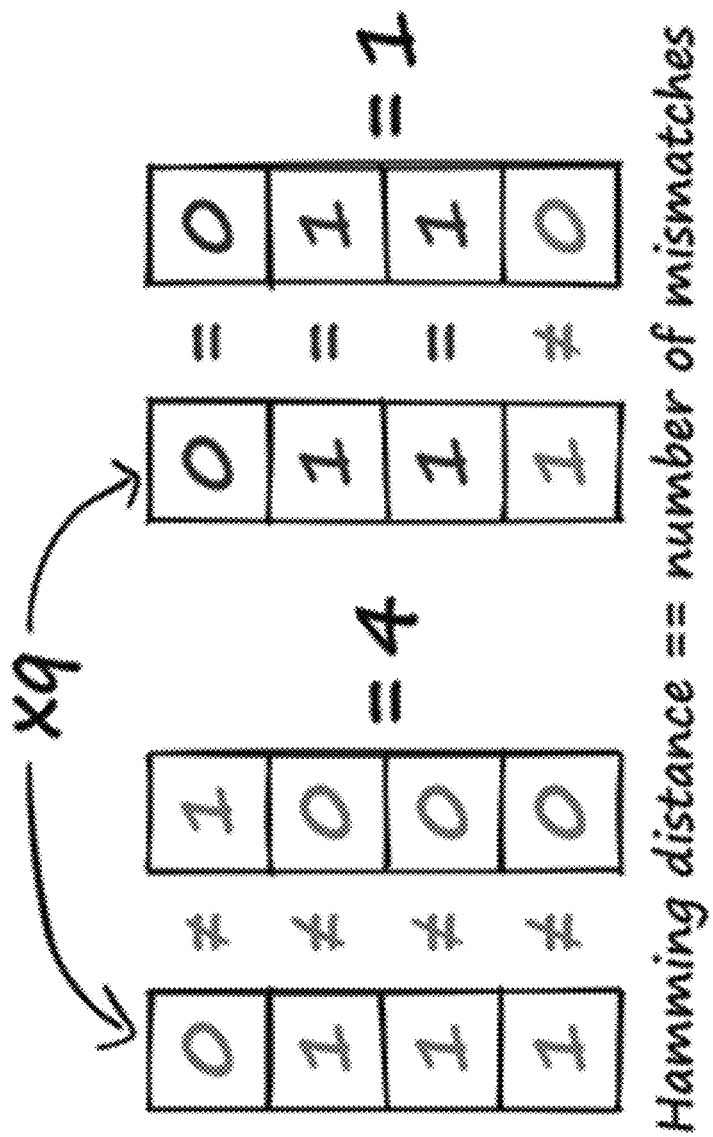
FIG. 5B illustrates aspects of calculating a Hamming distance, in accordance with some embodiments of the technology described herein.

FIG. 5B illustrates aspects of calculating a Hamming distance, in accordance with some embodiments of the technology described herein. The Hamming distance metric measures similarity between two numeric representations of data, such as N-dimensional vectors of data. In FIG. 5B, the Hamming distance is defined to be the number of mismatches between two vectors. In the first comparison, the number of mismatches between vectors "0111" and "1000" is 4 (i.e., the two vectors are entirely different). In the second comparison, the number of mismatches between vectors "0111" and "0110" is only 1 (i.e., only the last value is different). As a result, the Hamming distance between the two vectors of the second comparison is shorter than that of the first comparison.

Figure 6A:
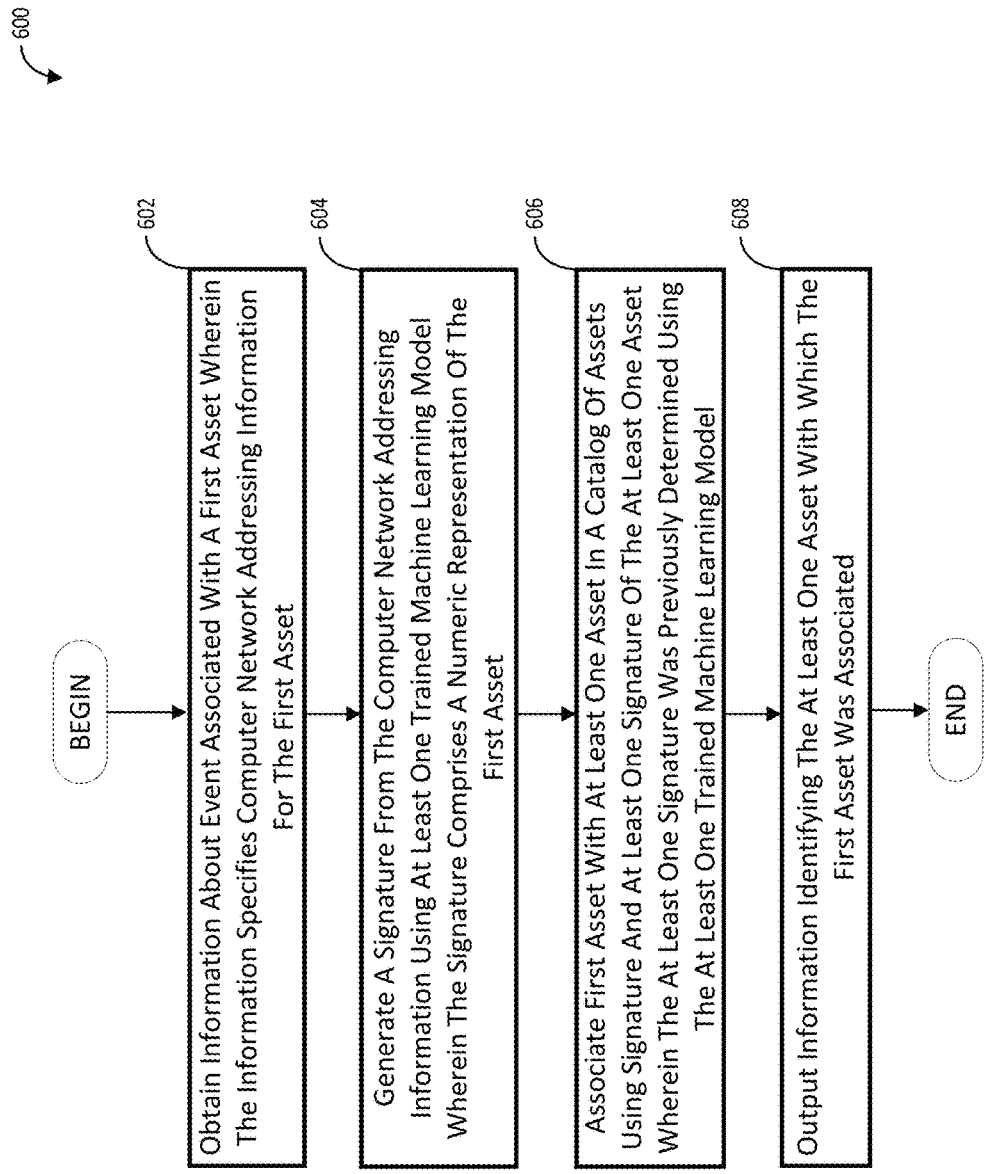
FIG. 6A is a flowchart of an illustrative process 600 for associating events with assets of a computer network using at least one trained machine learning model, in accordance with some embodiments of the technology described herein.

FIG. 6A is a flowchart of an illustrative process 600 for associating assets related to events with assets of a computer network using at least one trained machine learning model, in accordance with some embodiments of the technology described herein. Process 600 may be performed using any suitable combination of software and hardware and may be performed using any suitable computing device(s). For example, process 600 may be performed by asset correlation system 101 described with reference to FIGS. 1A-1C.

Process 600 begins at act 602, where information about an event related to a first asset is obtained. This information specifies computer network addressing information for the first asset. Examples of events and computer network addressing information and exemplary ways of obtaining such information are described herein. The information obtained may be in any suitable format, as aspects of the technology described herein are not limited in this respect. Act 602 may be performed in any suitable way including in any of the ways described with reference to act 202 of process 200 as described with reference to FIG. 2A.

Process 600 then proceeds to act 604, where a signature for the first asset is generated using at least one trained machine learning model from the computer network addressing information obtained at act 602. One of the at least one trained machine learning model may comprise one or more autoencoders, each having a respective encoder and a decoder, and the signature for the first asset may be generated by: (1) generating a numeric signature for the first asset (e.g., using the techniques described herein including with reference to numeric encoding module 132); and (2) providing the numeric signature as input to the encoder(s) to obtain the signature for the first asset. This is described further herein with reference to FIG. 6B.

Next, process 600 proceeds to act 606, where the first asset is associated with at least one asset in a catalog of assets using the signature generated at act 604 and signatures of assets in the catalog of assets (also generated, e.g., prior to execution of process 600, using the at least one trained machine learning model). Given the signatures, the association may be performed by comparing the signatures of the assets using any suitable measure of similarity (e.g., a Hamming distance or any other suitable distance metric).

In some embodiments, the associating may comprise: (1) identifying a subset of candidate assets in the asset catalog using a locality sensitive hashing technique; and (2) comparing the signature of the first asset with the signatures of only the assets in the subset of candidate assets. In this approach, the signature of the first asset need not be compared with signatures of all the assets in the asset catalog, leading to computational savings. Any of the LSH techniques described herein may be used in such embodiments.

Process 600 finally proceeds to act 608, where information identifying the at least one asset with which the first asset was associated is outputted. Examples of identifying information and techniques for outputting such information are described herein. Act 608 may be performed in any suitable way including in any of the ways described with reference to act 210 of process 200 as described with reference to FIG. 2A.

Figure 6B:
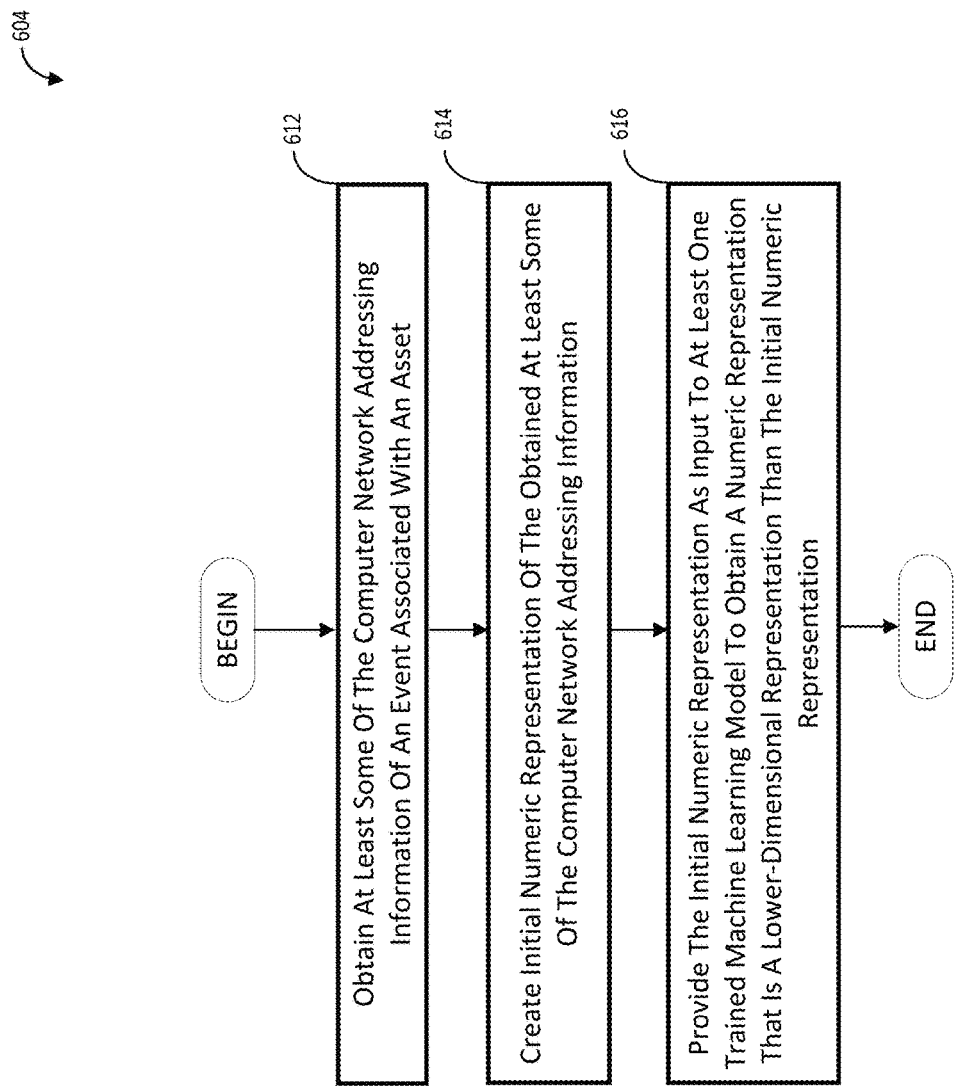
FIG. 6B is a flowchart of an illustrative process that may be used to implement act 604 of process 600 described with reference to FIG. 6A, in accordance with some embodiments of the technology described herein.

FIG. 6B is a flowchart of an illustrative process that may be used to implement act 604 of process 600 described with reference to FIG. 6A, in accordance with some embodiments of the technology described herein. FIG. 6B continues from act 604 of process 600. Acts of the process shown in FIG. 6B may be performed by the signature generation module 130 of asset correlation system 101.

Process 600 begins at act 612, where at least some of the computer network addressing information of an event related to an asset is obtained. Examples of computer network addressing information are provided herein. The information obtained may be in any suitable format, as aspects of the technology described herein are not limited in this respect. Act 612 may be performed in any suitable way including in any of the ways described with reference to act 202 of process 200 as described with reference to FIG. 2A and act 602 of process 600 as described with reference to FIG. 6A.

Next, process 600 proceeds to act 614, where an initial numeric representation of the obtained computer network addressing information is created. In some embodiments, the obtained computer network addressing information comprises or can be used to generate a string representation and characters (e.g., each character) of the string representation are mapped to an N-dimensional numeric representation (e.g., using a character embedding technique examples of which are provided herein, using one-hot encoding, or in any other suitable way). The N-dimensional vectors (assuming there are M of them) may then be stacked to obtain an N×M two-dimensional numeric representation of the computer network addressing information. Alternatively, the N-dimensional vectors may be concatenated to obtain a one dimensional vector of length N×M.

Process 600 then proceeds to act 616, where the initial numeric representation is provided as input to at least one trained machine learning model to obtain a numeric representation that is a lower-dimensional representation than the initial numeric representation. For example, the initial representation may be provided as input to an encoder (part of a trained autoencoder) to obtain the lower-dimensional representation. Thus, in some embodiments, an N×M matrix may be provided as input to the encoder.

Figure 6C:
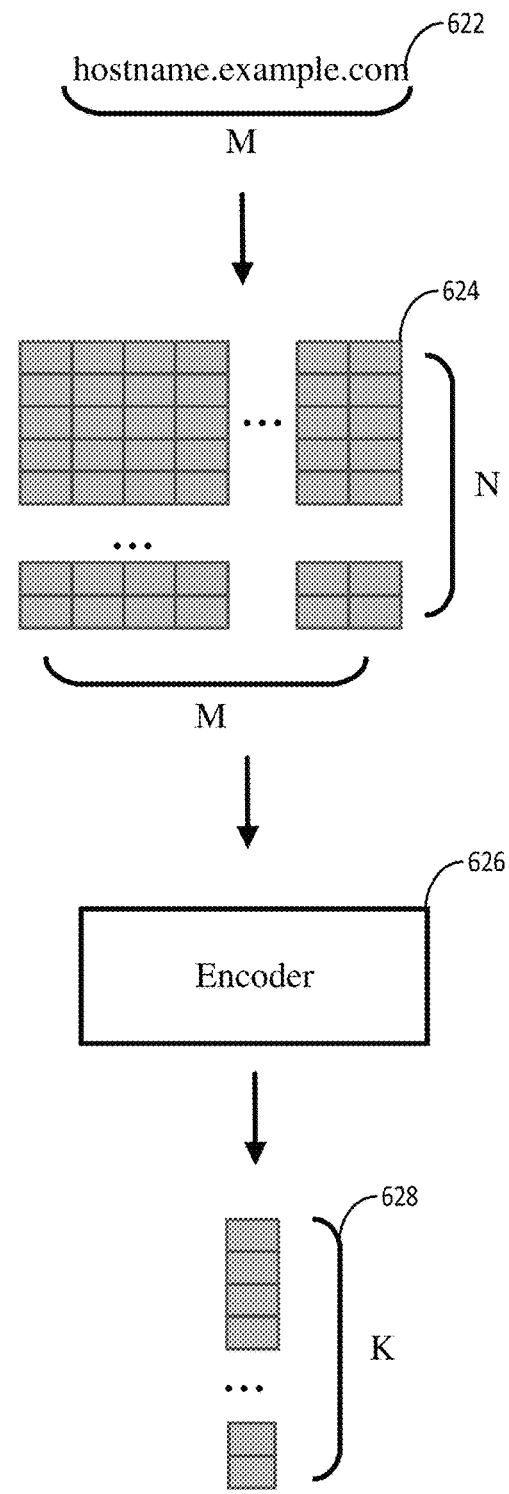
FIG. 6C shows an example of creating numeric signature of an asset using a trained machine learning model (e.g., an autoencoder) and associating the asset with one or more assets in an asset catalog using the created numeric signature, in accordance with some embodiments of the technology described herein.

This process is illustrated further in FIG. 6C, which shows an example of creating numeric signature of an asset using a trained machine learning model and associating the asset with one or more assets in an asset catalog using the created numeric signature, in accordance with some embodiments of the technology described herein. In this example, computer network addressing information 622, "hostname.example.com," is obtained. This string has M=20 characters. Next, each character of the string 622 is mapped to a corresponding N-dimensional vector (e.g., using a character embedding technique) resulting in an N×M matrix 624, which is provided as input to an encoder 626 (part of a trained autoencoder) to obtain a lower-dimensional (K<N×M) numeric representation 628, which in turn may be used to perform asset association.

In some embodiments, the at least one trained machine learning model consists of a single autoencoder having an encoder and a decoder. The numeric asset signature may be provided as input to the encoder of the single autoencoder in order to generate the lower-dimensional numeric signature. This is as in the example of FIG. 6C.

In other embodiments, the at least one trained machine learning model comprises multiple autoencoders (each having a respective encoder and decoder). In some such embodiments, the numeric asset signature may comprise multiple portions. Each of the multiple portions may be a numeric representation of a piece of information in the computer network addressing information (e.g., a network parameter value or other information part of the computer network addressing information). Each of the multiple portions may be provided as input to a respective encoder (part of a respective autoencoder) to produce a corresponding output. In turn, the outputs from the multiple encoders may be combined to generate the lower-dimensional numeric signature.

For example, the numeric asset signature may comprise a first portion that is a numeric representation of a MAC address, a second portion that is a numeric representation of an IP address, and third portion that is a numeric representation of a hostname. In this example, the at least one trained machine learning model may comprise three autoencoders including a first autoencoder trained on MAC addresses, a second autoencoder trained on IP addresses, and a third autoencoder trained on hostnames. The first, second, and third portions of the numeric asset signature may then be provided as inputs to the first, second, and third encoders (of the corresponding first, second, and third autoencoders) respectively to generate corresponding first, second, and third outputs. These three outputs may then be concatenated to form a lower-dimensional version of the original numeric asset signature.

Figure 6D:
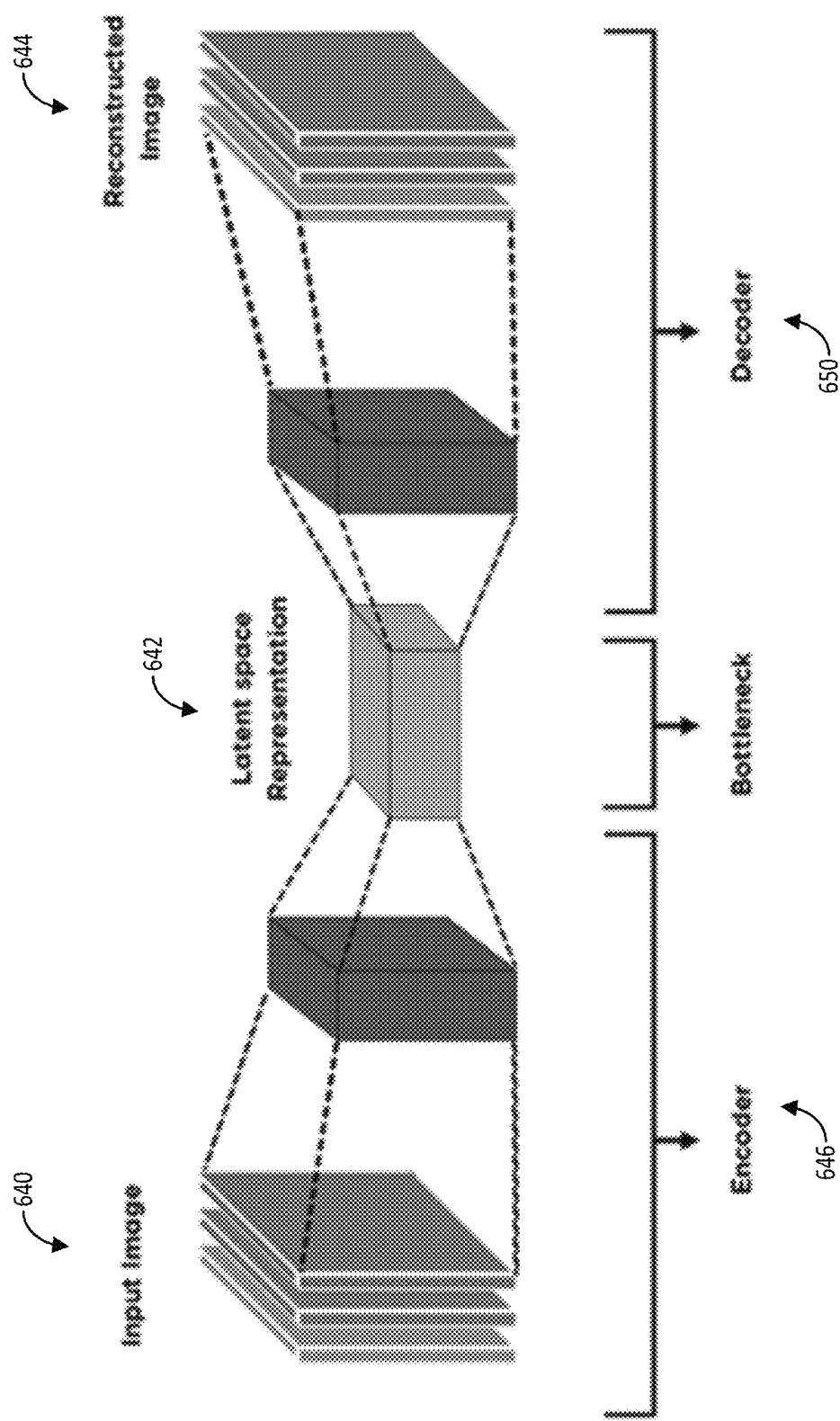
FIG. 6D shows is an illustration of an autoencoder, in accordance with some embodiments of the technology described herein.

FIG. 6D shows an illustration of an example autoencoder 644 having an encoder 646 and decoder 650. The example autoencoder is configured to receive an image 640 as input, map the input image 640 using the encoder 646 to a corresponding latent space representation 642 and reconstruct the original image from the latent space representation 642 using decoder 650 to obtain reconstructed image 644. Ideally, the reconstructed image 644 is as close to the input image 640 as possible. In some embodiments, the input image 640 may include the N×M numeric representation illustrated in FIG. 6C and the encoder 646 may be used to compress the input image 640 (representing the initial numeric signature of an asset) to obtain a corresponding latent space representation (representing the lower-dimensional numeric signature for the asset).

Any suitable autoencoder architecture may be used for any of the autoencoders described herein. In some embodiments, an autoencoder may be a convolutional autoencoder in which the encoder has one or multiple convolutional layers and the decoder also has one or more transpose convolutional layers. Each of the convolutional layers may comprise any number of convolutional filters (e.g., 1, 2, 4, 8, 16, 32, 64, 128). The filter size may be of any length (e.g., 8, 16, 32, or 64, or any number between 4 and 64) and the filters may be applied with any suitable stride (e.g., 1, 2, 3, 4, 8, etc.). Additionally, each of the encoder and decoder may have one or more non-linear layers (e.g., a ReLU layer or any hidden layer comprising any suitable number of neurons) and one or more pooling layers (e.g., one or more maximum pooling layers, one or more average pooling layers).

As one example, in some embodiments, the encoder may comprise a convolutional layer having 128 convolutional filters. Each of the convolutional filters may have length 4 and by applied by using a stride of length 1. Post convolution, max pooling is applied, after which a hidden layer of 16 neurons may be used. Accordingly, in this example, for a given input matrix N×M, where N is the number of characters and M=300 (the dimension of the embedding), each of the 128 filters (with each filter having size 4×300), performs a 1D convolution with a stride of 1. This produces 128 activation maps, one per filter. Max pooling selects the highest activation per filter, resulting in a 128-dimensional vector, which is then compressed to a 16-dimensional vector. This 16-dimensional compressed vector is the encoding. In this example, the decoder would have a reverse architecture for symmetry, as illustrated in the example diagram of FIG. 6D.

Figure 6E:
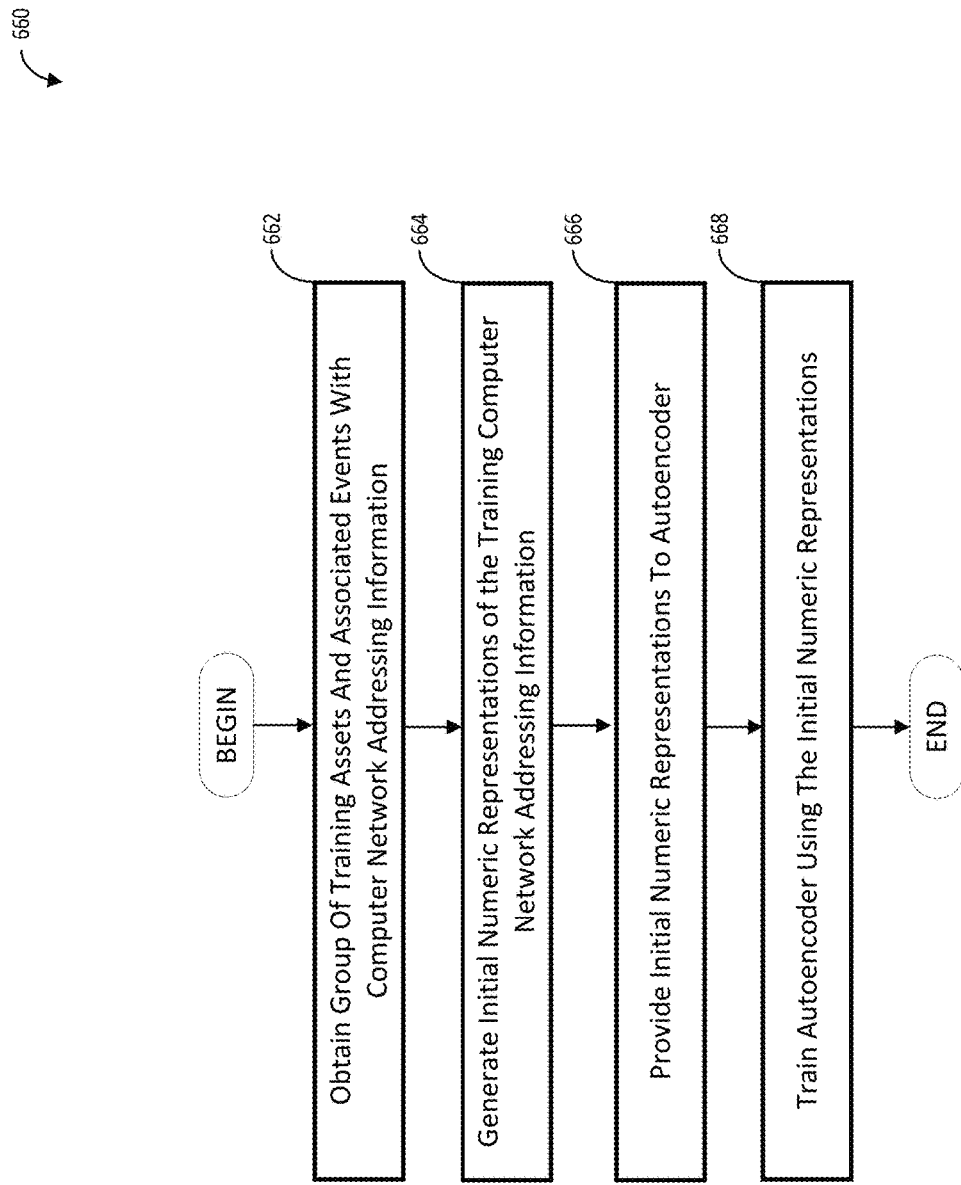
FIG. 6E is a flowchart of an illustrative process 660 for training an autoencoder, in accordance with some embodiments of the technology described herein.

FIG. 6E is a flowchart of an illustrative process 660 for training an autoencoder, in accordance with some embodiments of the technology described herein. In reference to FIGS. 6A-6C, an autoencoder may be configured and trained using a group of the computer network's assets and associated events that are designated for training purposes. This autoencoder may serve as one of the at least one trained machine learning model of the embodiments described in FIGS. 6A-6C. The training of the autoencoder may occur in a separate module, such as the training module 138 of the signature generation module 130.

Process 660 starts at act 662, where a group of training assets and associated events with computer network addressing information is obtained. The type of training assets and associated events may be any of the types of assets and events described herein. Examples of assets and associated events are described herein including with reference to FIGS. 1B-1C, 2A-2D, 6A-6C. An operator of the asset correlation system 101 may determine the type of training assets and associated events, or alternatively the training module 138 may automatically determine which assets and associated events to use for training. The training assets and associated events may be diverse to encapsulate the various types of assets present in the computer network. Additionally, the training assets and associated events of varying types may be chosen in equal amounts based on their types as to balance the training group. Alternatively, the training module 138 may use previously encountered assets and associated events as part of the training group, and/or artificially generate events associated with assets to augment the training group. It should be recognized that any suitable method of obtaining training data may be used.

Next, process 660 proceeds to act 664, where initial numeric representations of the training computer network addressing information are generated. Examples of numeric representations of computer network addressing information are provided herein. The information obtained may be in any suitable format, as aspects of the technology described herein are not limited in this respect. Act 664 may be performed in any suitable way including in any of the ways described with reference to act 614 of process 600 as described with reference to FIG. 6A. The numeric representations may be generated in formats of images of dimensions N×M.

Next, process 660 proceeds to act 666, where the initial numeric representations are provided to the autoencoder. The initial numeric representations are provided as inputs to the autoencoder. The training module 138 may decide to provide all of the initial numeric representations to the autoencoder or may alternatively decide to provide the representations to the autoencoder in training batches.

Finally, process 660 proceeds to act 668, where the autoencoder is trained using the initial numeric representations. During the training process, the autoencoder generates a compressed, discriminative form of the training input data (i.e., latent space representation). This compressed form may also be referred to as the encoding of the input data. The encoding is then be passed through the decoder that mirrors the encoder to generate a reconstructed output of the training input. The autoencoder may then calculate a reconstruction loss representing the difference between the training input data and the reconstructed output of the training input. The reconstruction loss may be any mathematical representation of the difference between the training input and the reconstructed output. For instance, the reconstruction loss may be calculated using a measure of similarity that measures a quantifiable difference between the training input images and the reconstructed output images. Examples of functions for calculating the reconstruction loss may include Mean Squared Error (MSE) function, Least Absolute Deviations (LAD; also referred to as L1) loss function, Least Squared Errors (LS; also referred to as L2) loss function, and cross entropy loss function.

The goal of the training process of the autoencoder is to minimize the reconstruction loss. The configurations of the layers of the autoencoder may be modified in order to minimize the reconstruction loss (i.e., get it as close to 0 as possible). For instance, an exemplary autoencoder may comprise convolutional layers, each of varying size. The initial dimensions of the sublayers in each of the convolutional layers may all be of the same size. The filters of the convolutional layers may be of dimensions L×M, where L may be any one of 8, 16, 32, or 64, or any number in between 4 and 64. The parameters of the activation functions in between each of the layers may be modified during the training process to minimize the reconstruction loss, using any suitable technique, as aspects of the technology described herein are not limited in this respect.

Figure 7A:
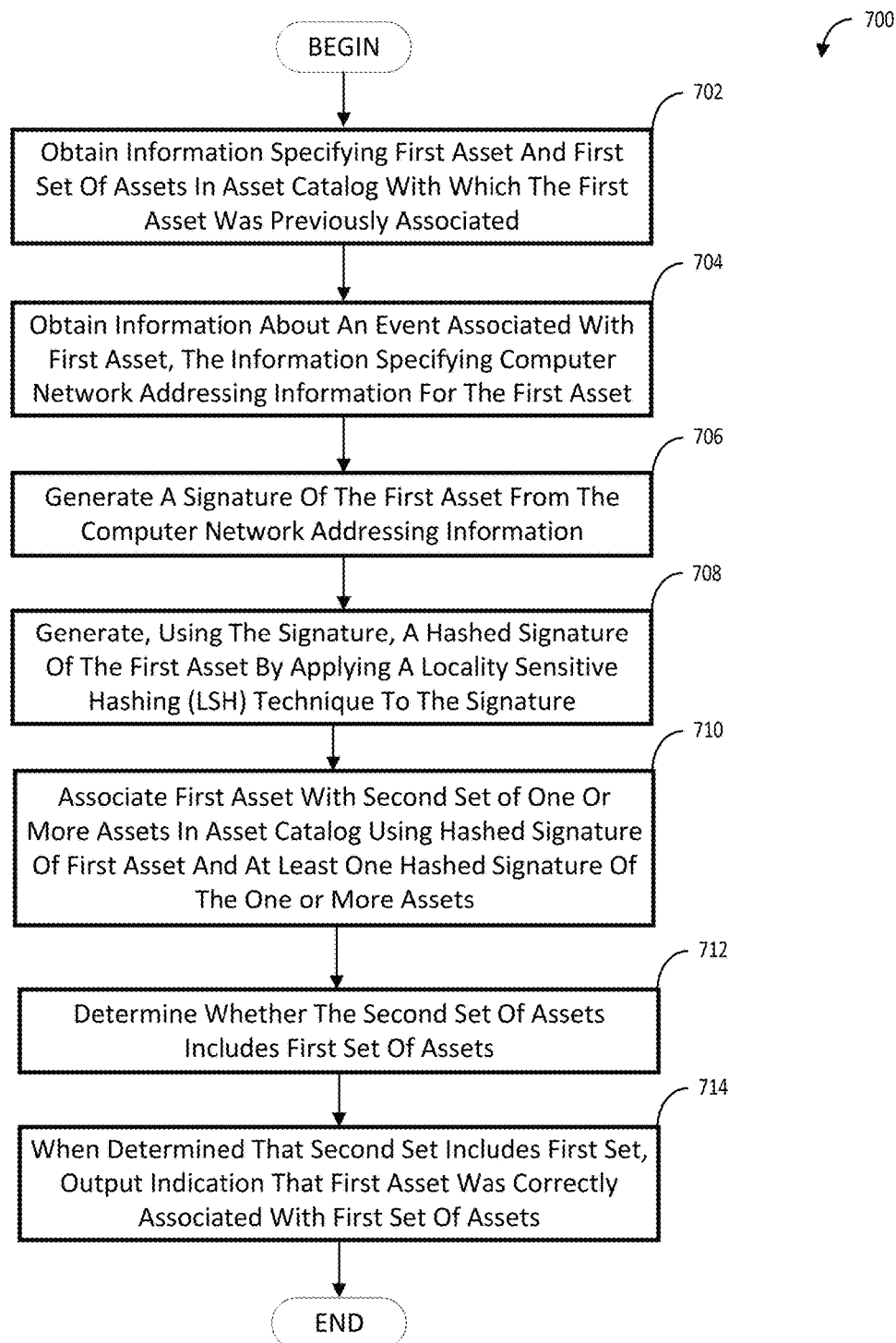
FIG. 7A is a flowchart of an illustrative process 700 for verifying correctness of associations between assets related to events and assets of a computer network using locality sensitive hashing, in accordance with some embodiments of the technology described herein.

FIG. 7A is a flowchart of an illustrative process 700 for verifying correctness of associations between events and assets of a computer network using locality sensitive hashing, in accordance with some embodiments of the technology described herein. Process 700 may be performed using any suitable combination of software and hardware and may be performed using any suitable computing device(s). For example, process 700 may be performed by the exemplary asset correlation system 101 described with reference to FIGS. 1A-1C.

Process 700 begins at act 702, where information specifying a first asset and first set of assets in an asset catalog with which the first asset was previously associated is obtained. The information may include any identifying information of the first asset and the assets in the first set. For instance, the information may comprise computer network addressing information, and as described herein including with reference to FIGS. 1A-1C. The information obtained may be in any suitable format as described herein, as aspects of the technology described herein are not limited in this respect.

In addition, this information may be obtained from any suitable source requiring the verification of correctness. For instance, as described herein including with reference to FIG. 1C, the asset correlation system 101 may have stored information related to an asset and the asset(s) with which this asset was previously associated. This information may then be obtained for this act. Alternatively, the information may be obtained from an external source, such as external software requiring verification of the correctness of its associations. For instance, a sub-network of the computer network may perform associations of its own but may wish to verify its associations with the asset correlation system 101. The sub-network may accordingly provide this information, specifying a first asset of its sub-network and a first set of assets with which the first asset was previously associated, to the asset correlation system.

Next, process 700 proceeds to act 704, where information about an event related to the first asset is obtained. The information about an event may specify computer network addressing information for the first asset. Examples of computer network addressing information are provided herein. The information obtained may be in any suitable format, as aspects of the technology described herein are not limited in this respect. Act 704 may be performed in any suitable way including in any of the ways described with reference to act 202 of process 200 as described with reference to FIG. 2A and act 602 of process 600.

Process 700 then proceeds to act 706, where a signature of the first asset is generated from the computer network addressing information. Examples of signatures of assets and exemplary description of generation of these signatures are provided herein. Act 706 may be performed in any suitable way including in any of the ways described with reference to act 204 of process 200 as described with reference to FIG. 2A.

Process 700 then proceeds to act 708, where, using the signature, a hashed signature of the first asset is generated by applying a locality sensitive hashing (LSH) technique to the signature. Examples of hashed signatures of assets and exemplary description of generation of these hashed signatures by applying LSH techniques are provided herein. Act 708 may be performed in any suitable way including in any of the ways described with reference to act 206 of process 200 as described with reference to FIG. 2A.

Process 700 then proceeds to act 710, where the first asset is associated with a second set of one or more assets in the asset catalog using the hashed signature of the first asset and at least one hashed signature of the one or more assets. Exemplary discussions of such association using hashed signatures are provided herein. Act 710 may be performed in any suitable way including in any of the ways described with reference to act 208 of process 200 as described with reference to FIG. 2A.

Process 700 then proceeds to act 712, where it is determined whether the second set of assets includes the first set of assets. This determination may use any suitable method for determining whether the second set includes the first set. For instance, this determination may involve comparing the assets in the first set with each of the assets of the second set. During such comparison, the asset correlation system 101 may determine whether the any of the information identifying the assets are equivalent. This may comprise comparing any information specifying the assets, such as computer network addressing information related to the assets and labels identifying the software/hardware components of the assets. Any suitable identifying information described herein may be used, and any method of comparison of the information may be used, including string and alphanumeric comparison methods. In addition, the determination of whether the second set includes the first set may involve comparing the first and second sets using any suitable set comparison methods, including any measures of similarity, such as the Jaccard index described herein including with reference to FIG. 5A.

Process 700 finally proceeds to act 714, where, if it is determined that the second set includes the first set, indication that the first asset was correctly associated with the first set of assets is outputted. The indication may be outputted in any suitable method. For instance, the indication may be a simple message indicating that the first asset was correctly associated with the first set of assets, and the message may be delivered to the entity that provided the information for verification. Alternatively, the process may determine that the first set of assets is not part of the second set of assets. In this scenario, indication that the first asset was not correctly associated with the first set of assets may be outputted at least in the same manner as described previously.

Figure 7B:
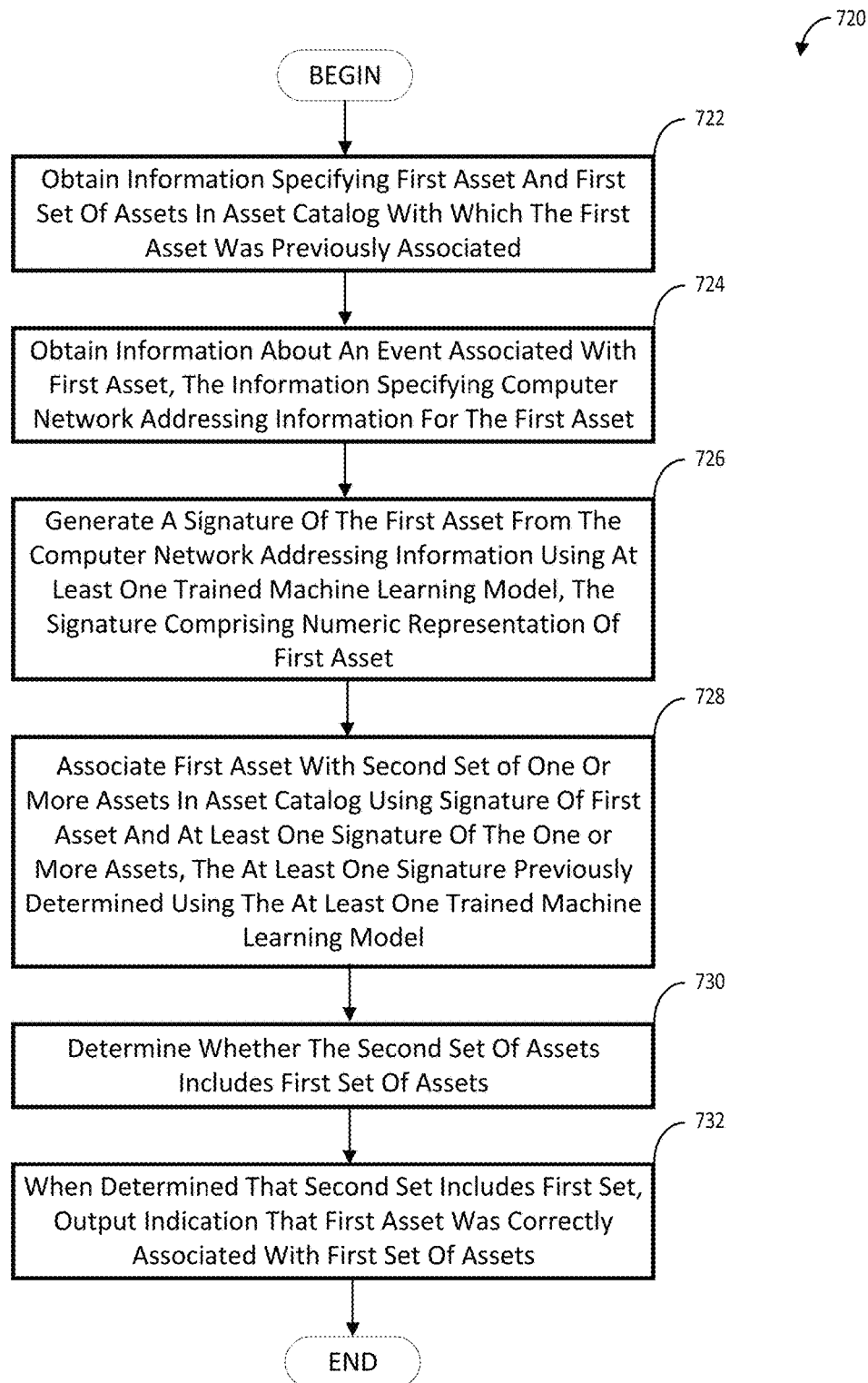
FIG. 7B is a flowchart of an illustrative process 720 for verifying correctness of associations between assets related to events and assets of a computer network using at least one trained machine learning model, in accordance with some embodiments of the technology described herein.

FIG. 7B is a flowchart of an illustrative process 720 for verifying correctness of associations between events and assets of a computer network using at least one trained machine learning model, in accordance with some embodiments of the technology described herein. Process 720 may be performed using any suitable combination of software and hardware and may be performed using any suitable computing device(s). For example, process 720 may be performed by the exemplary asset correlation system 101 described with reference to FIGS. 1A-1C.

Process 720 begins with act 722, where information specifying a first asset and first set of assets in an asset catalog with which the first asset was previously associated is obtained. Examples of such information are provided herein. The information obtained may be in any suitable format, as aspects of the technology described herein are not limited in this respect. Act 722 may be performed in any suitable way including in any of the ways described with reference to act 702 of process 700 as described with reference to FIG. 7A.

Next, process 720 proceeds to act 724, where information about an event related to the first asset is obtained. The information about an event may specify computer network addressing information for the first asset. Examples of computer network addressing information are provided herein. The information obtained may be in any suitable format, as aspects of the technology described herein are not limited in this respect. Act 724 may be performed in any suitable way including in any of the ways described with reference to act 704 of process 700 as described with reference to FIG. 7A and act 602 of process 600.

Next, process 720 proceeds to act 726, where a signature of the first asset is generated from the computer network addressing information using at least one trained machine learning model. The signature may comprise a numeric representation of the first asset. Examples of signatures of assets and exemplary description of generating these signatures using trained machine learning models are provided herein. Act 726 may be performed in any suitable way including in any of the ways described with reference to act 604 of process.

Next, process 720 proceeds to act 728, where a first asset is associated with a second set of one or more assets in an asset catalog using the signature of the first asset and at least one signature of the one or more assets in the asset catalog. The at least one signature of the at least one asset may be previously determined using the at least one trained machine learning model. Exemplary discussions of such association using the signatures and the trained machine learning models are described herein. Act 728 may be performed in any suitable way including in any of the ways described with reference to act 606 of process 600 as described with reference to FIG. 6A.

Next, process 720 proceeds to act 730, where it is determined whether the second set of assets includes the first set of assets. Examples of such determination are described herein. Act 730 may be performed in any suitable way including in any of the ways described with reference to act 712 of process 700 as described with reference to FIG. 7A.

Finally, process 720 proceeds to act 732, where, if it is determined that the second set includes the first set, indication that the first asset was correctly associated with the first set of assets is outputted. Examples of outputting such indication are described herein. Act 732 may be performed in any suitable way including in any of the ways described with reference to act 714 of process 700 as described with reference to FIG. 7A. Alternatively, the process may determine that the first set of assets is not part of the second set of assets. In this scenario, indication that the first asset was not correctly associated with the first set of assets may be outputted at least in the same manner as described previously.

Figure 8:
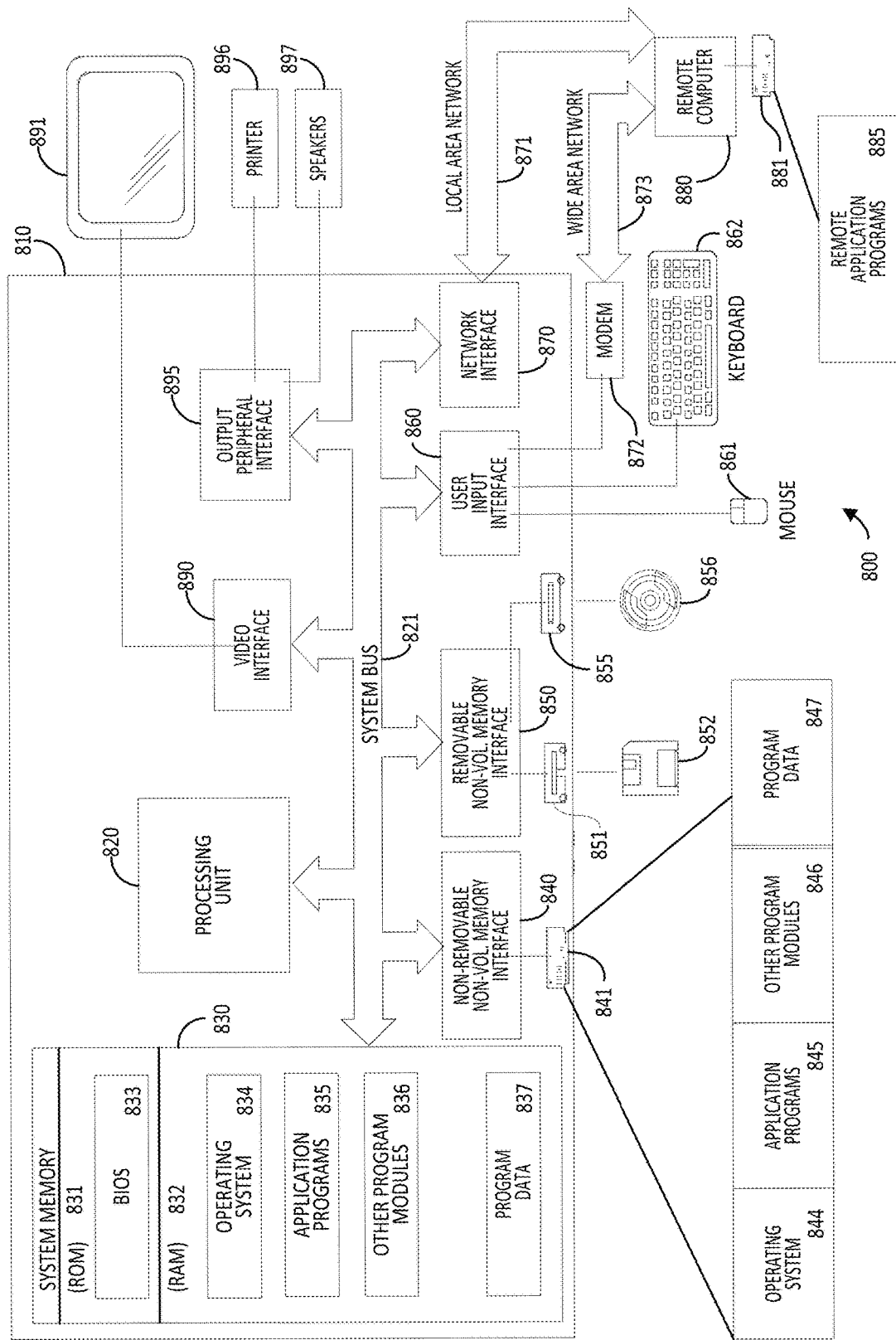
FIG. 8 shows a block diagram of an exemplary computing device, in accordance with some embodiments of the technology described herein.

FIG. 8 shows a block diagram of an exemplary computing device, in accordance with some embodiments of the technology described herein. The computing system environment 800 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile or nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media described above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. An actor may enter commands and information into the computer 810 through input devices such as a keyboard 862 and pointing device 861, commonly referred to as a mouse, trackball, or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device, or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the actor input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 2A-2D, 6A-6B, 6E, and 7A-7B. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for verifying correctness of associations between assets related to events detected in at least one computer network and assets in an asset catalog for the at least one computer network, the asset catalog assets being addressable devices on the at least one computer network, the method comprising:
 using at least one computer hardware processor to perform:
  obtaining information specifying a first asset and a first set of one or more assets, in the asset catalog, with which the first asset was previously associated;

obtaining information about an event related to the first asset, the information specifying computer network addressing information for the first asset;

generating a signature of the first asset from the computer network addressing information;

generating, using the signature of the first asset, a hashed signature of the first asset by applying a locality sensitive hashing (LSH) technique to the signature of the first asset;

associating the first asset with a second set of one or more assets in the asset catalog using the hashed signature of the first asset and at least one hashed signature of the one or more assets of the second set in the asset catalog;

determining whether the second set of assets includes the first set of assets; and when it is determined that the second set of assets includes the first set of assets, outputting an indication that the first asset was correctly associated with the first set of assets.

2. The method of claim 1, further comprising:
when it is determined that at least one asset in the first set of assets is not part of the second set of assets, outputting an indication that the first asset was not correctly associated with the first set of assets.

3. The method of claim 1, wherein the computer network addressing information indicates at least one value for at least one network parameter, the at least one network parameter selected from the group consisting of: a hostname for the first asset on the at least one computer network, an IP address for the first asset on the at least one computer network, and/or a MAC address for the first asset.

4. The method of claim 1, wherein generating the signature of the first asset comprises generating a string representation of at least some of the computer network addressing information.

5. The method of claim 1, wherein generating the signature of the first asset comprises generating a numeric representation of at least some of the computer network addressing information using a character embedding technique.

6. The method of claim 5, wherein generating the numeric representation of the at least some of the computer network addressing information comprises:
generating an initial numeric representation by applying the character embedding technique to the at least some of the computer network addressing information; and
providing the initial numeric representation as input to at least one trained machine learning model to obtain the numeric representation,
wherein the numeric representation is a lower-dimensional representation than the initial numeric representation.

7. The method of claim 1, wherein applying the LSH technique to the signature of the first asset comprises applying a min-hash technique to the signature of the first asset.

8. The method of claim 7, wherein applying the min-hash technique to the signature of the first asset comprises:
generating a plurality of shingles from the signature of the first asset;
obtaining a plurality of hashes by hashing the plurality of shingles using one or more hashing functions;
permuting the plurality of hashes to obtain a permuted plurality of hashes;
selecting a first threshold number of hashes in the permuted plurality of hashes;

generating the hashed signature of the first asset using the selected hashes.

9. The method of claim 8, wherein the permuting comprises permuting the plurality hashing randomly.

10. The method of claim 5, wherein applying the LSH technique to the signature of the first asset comprises encoding the numeric representation using a plurality of randomized hyperplanes.

11. The method of claim 10, wherein encoding the numeric representation using the plurality of randomized hyperplanes, comprises:
generating the hashed signature of the first asset as a binary encoding of the numeric representation, the binary encoding specifying, for each particular hyperplane of the plurality of randomized hyperplanes, a side of the particular hyperplane on which the numeric representation falls.

12. The method of claim 1, wherein the at least one asset comprises multiple assets in the asset catalog, and wherein the associating comprises:
comparing the signature of the first asset with signatures of each of the multiple assets in the asset catalog; and
associating the first asset with a particular one of the multiple assets based on results of the comparing.

13. A system for verifying correctness of associations between assets related to events detected in at least one computer network and assets in an asset catalog for the at least one computer network, the asset catalog assets being addressable devices on the at least one computer network, the system comprising:
at least one computer hardware processor; and
at least one non-transitory computer-readable storage medium storing processor executable instructions that, when executed by the at least one computer hardware processor, cause the at least one computer hardware processor to perform a method comprising:
obtaining information specifying a first asset and a first set of one or more assets, in the asset catalog, with which the first asset was previously associated;
obtaining information about an event related to the first asset, the information specifying computer network addressing information for the first asset;
generating a signature of the first asset from the computer network addressing information;
generating, using the signature of the first asset, a hashed signature of the first asset by applying a locality sensitive hashing (LSH) technique to the signature of the first asset;
associating the first asset with a second set of one or more assets in the asset catalog using the hashed signature of the first asset and at least one hashed signature of the at one or more assets of the second set in the asset catalog;
determining whether the second set of assets includes the first set of assets; and
when it is determined that the second set of assets includes the first set of assets, outputting an indication that the first asset was correctly associated with the first set of assets.

14. The system of claim 13, wherein the method further comprises:
when it is determined that at least one asset in the first set of assets is not part of the second set of assets, outputting an indication that the first asset was not correctly associated with the first set of assets.

15. The system of claim 13, wherein applying the LSH technique to the signature of the first asset comprises applying a min-hash technique to the signature of the first asset.

16. The system of claim 15, wherein applying the min-hash technique to the signature of the first asset comprises:
- generating a plurality of shingles from the signature of the first asset;
- obtaining a plurality of hashes by hashing the plurality of shingles using one or more hashing functions;
- permuting the plurality of hashes to obtain a permuted plurality of hashes;
- selecting a first threshold number of hashes in the permuted plurality of hashes;
- generating the hashed signature of the first asset using the selected hashes.

17. At least one non-transitory computer-readable storage medium storing processor executable instructions that, when executed by at least one computer hardware processor, cause the at least one computer hardware processor to perform a method comprising:
- obtaining information specifying a first asset and a first set of one or more assets, in an asset catalog, with which the first asset was previously associated, the first asset and the assets of the asset catalog being addressable devices on at least one computer network;
- obtaining information about an event related to the first asset, the information specifying computer network addressing information for the first asset;
- generating a signature of the first asset from the computer network addressing information;
- generating, using the signature of the first asset, a hashed signature of the first asset by applying a locality sensitive hashing (LSH) technique to the signature of the first asset;
- associating the first asset with a second set of one or more assets in the asset catalog using the hashed signature of the first asset and at least one hashed signature of the one or more assets of the second set in the asset catalog;
- determining whether the second set of assets includes the first set of assets; and
- when it is determined that the second set of assets includes the first set of assets, outputting an indication that the first asset was correctly associated with the first set of assets.

18. The at least one non-transitory computer-readable storage medium of claim 17, wherein the method further comprises:
- when it is determined that at least one asset in the first set of assets is not part of the second set of assets, outputting an indication that the first asset was not correctly associated with the first set of assets.

19. The at least one non-transitory computer-readable storage medium of claim 17, wherein applying the LSH technique to the signature of the first asset comprises applying a min-hash technique to the signature of the first asset.

20. The at least one non-transitory computer-readable storage medium of claim 19, wherein applying the min-hash technique to the signature of the first asset comprises:
- generating a plurality of shingles from the signature of the first asset;
- obtaining a plurality of hashes by hashing the plurality of shingles using one or more hashing functions;
- permuting the plurality of hashes to obtain a permuted plurality of hashes;
- selecting a first threshold number of hashes in the permuted plurality of hashes;
- generating the hashed signature of the first asset using the selected hashes.

* * * * *